United States Patent
Verschuere et al.

(10) Patent No.: US 11,834,582 B2
(45) Date of Patent: Dec. 5, 2023

(54) FLUOROPOLYMER COATINGS FOR SUBSTRATES COMPRISING AN ELASTOMERIC MATERIAL

(71) Applicant: 3M INNOVATIVE PROPERTIES COMPANY, St. Paul, MN (US)

(72) Inventors: Alain G. Verschuere, Melsele (BE); Joachim Kneer, Balve (DE); Anne Van Royen, Melsele (BE)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 493 days.

(21) Appl. No.: 16/973,996

(22) PCT Filed: Jun. 11, 2019

(86) PCT No.: PCT/IB2019/054876
§ 371 (c)(1),
(2) Date: Dec. 10, 2020

(87) PCT Pub. No.: WO2019/239326
PCT Pub. Date: Dec. 19, 2019

(65) Prior Publication Data
US 2021/0115286 A1    Apr. 22, 2021

Related U.S. Application Data

(60) Provisional application No. 62/683,714, filed on Jun. 12, 2018.

(51) Int. Cl.
*C09D 127/18* (2006.01)
*C09J 127/18* (2006.01)

(52) U.S. Cl.
CPC .......... *C09D 127/18* (2013.01); *C09J 127/18* (2013.01)

(58) Field of Classification Search
CPC .............................. C09D 127/18; C09J 127/18
USPC ....................................................... 524/805
See application file for complete search history.

(56) References Cited

U.S. PATENT DOCUMENTS

| | | | |
|---|---|---|---|
| 3,332,907 | A | 7/1967 | Angelo |
| 4,349,650 | A | 9/1982 | Krespan |
| 5,328,946 | A | 7/1994 | Tuminello |
| 6,201,085 | B1 | 3/2001 | Matsukura et al. |
| 2009/0018275 | A1 | 1/2009 | Campbell |
| 2016/0185995 | A1* | 6/2016 | Mugisawa .............. B32B 27/32 524/546 |

FOREIGN PATENT DOCUMENTS

| | | |
|---|---|---|
| CN | 101084246 A | 12/2007 |
| CN | 101370835 A | 2/2009 |
| CN | 102597118 A | 7/2012 |
| CN | 102652160 A | 8/2012 |
| EP | 1997795 | 12/2008 |
| EP | 3333229 | 6/2018 |
| JP | 2014-070101 | 4/2014 |
| WO | WO2008/094758 A1 | 8/2008 |
| WO | WO-2015148285 A1 * | 10/2015 ............. B32B 27/08 |
| WO | WO 2018-107017 | 6/2018 |

OTHER PUBLICATIONS

International Search Report for PCT International Application No. PCT/IB2019/054876, dated Oct. 16, 2019, 4 pages.

* cited by examiner

*Primary Examiner* — Deve V Hall
(74) *Attorney, Agent, or Firm* — Thomas M. Spielbauer

(57) ABSTRACT

The present disclosure relates to a method of treating a substrate comprising an elastomeric material, wherein the method comprises the steps of: a) providing a composition comprising: i. at least one fluoropolymer which is a copolymer comprising at least 90% by weight, based on the total weight of the copolymer, of units derived from tetrafluoroethene (TFE) and from one or more perfluorinated alkyl ethers corresponding to the general formula (I): $R_{f1}$—O—$(CF_2)_n$—$CF=CF_2$ (I) wherein n is 1 or 0 and $R_{f1}$ represents a perfluoroalkyl residue which is optionally interrupted once or more than once by an oxygen atom; and ii. at least one solvent comprising a linear, cyclic or branched, partially fluorinated (poly)ether; b) contacting at least part of the substrate with the composition of step a); c) at least partially removing the at least one solvent; and d) optionally, when the fluoropolymer is curable, subjecting the fluoropolymer to curing, wherein the curing step may be carried out simultaneously with or after step c).

9 Claims, No Drawings

FLUOROPOLYMER COATINGS FOR SUBSTRATES COMPRISING AN ELASTOMERIC MATERIAL

CROSS REFERENCE TO RELATED APPLICATIONS

This application is a national stage filing under 35 U.S.C. 371 of PCT/IB2019/054876, filed Jun. 11, 2019, which claims the benefit of Provisional Application No. 62/683,714, filed Jun. 12, 2018, the disclosure of which is incorporated by reference in their entirety herein.

TECHNICAL FIELD

The present disclosure relates generally to the field of coatings, more specifically to the field of fluoropolymer compositions suitable for coating substrates comprising an elastomeric material. The present disclosure further relates to a method of treating a substrate comprising an elastomeric material, coated articles and assemblies comprising such fluoropolymer coatings. The present disclosure is further directed to various uses of such fluoropolymer compositions.

BACKGROUND

Fluoropolymers, in particular highly fluorinated polymers, such as polymers with a high content of tetrafluoroethene (TFE), have achieved outstanding commercial success due to their chemical and thermal inertness. They are used in a wide variety of applications in which severe operating conditions such as exposure to high temperatures and/or aggressive chemicals are encountered. Typical end use applications of the polymers include but are not limited to seals for engines, seals in oil-well drilling devices, and sealing elements for industrial equipment that operates at high temperatures or in a chemically aggressive environment. The outstanding properties of the highly fluorinated polymers are largely attributable to the stability and inertness of the copolymerized perfluorinated monomer units that make up the major portion of the polymer backbone in these compositions. Such monomers include tetrafluoroethene and other perfluorinated alpha-olefins.

Applying a fluoropolymer coating onto a substrate is a well-known method for imparting enhanced properties to the treated substrate. It is however a recognized challenge in the art to achieve acceptable dissolution of highly fluorinated polymers, in particular perfluoroelastomers, in solvents, which renders the preparation of coating compositions particularly inconvenient. Typically known solvents for dissolving fluorinated polymers are fluoro-based solvents, as described in U.S. Pat. No. 5,328,946 (Tuminello et al.). A partial solution for making a perfluoropolymer coating by dissolving perfluoroelastomers in certain perfluorinated liquids is described in US-A1-2009/0018275 (Campbell et al.). The described solutions are not always satisfactory for making coating compositions having a relatively high content of fluoropolymer, in particular coating compositions suitable for forming thin fluoropolymer coating layers on substrates, whilst maintaining acceptable coating viscosity characteristics.

Moreover, because fluoropolymers, and in particular perfluoroelastomeric materials, are particularly expensive, there is still a need for more cost-efficient ways to impart substrates and articles with the enhanced properties known from fluoropolymers.

Elastomeric materials have been used for a variety of applications, including sealing, adhering, damping, insulating, forming of molded flexible parts and for various uses in the automotive industry. With broadened use of elastomeric materials over the years, performance requirements have become more and more demanding, in particular in terms of usage in intensive operating conditions such as exposure to high mechanical and/or chemical stress, and ability to preserve sealing properties under such challenging conditions.

Without contesting the technical advantages associated with the solutions known in the art, there is still a need for a cost-effective and improved process for imparting a substrate comprising an elastomeric material with enhanced properties.

SUMMARY

According to one aspect, the present disclosure relates to a method of treating a substrate comprising an elastomeric material, wherein the method comprises the steps of:
a) providing a composition comprising:
  i. at least one fluoropolymer which is a copolymer comprising at least 90% by weight, based on the total weight of the copolymer, of units derived from tetrafluoroethene (TFE) and from one or more perfluorinated alkyl ethers corresponding to the general formula (I):

$$R_{f1}\text{—}O\text{—}(CF_2)_n\text{—}CF\text{=}CF_2 \qquad (I)$$

wherein n is 1 or 0 and $R_{f1}$ represents a perfluoroalkyl residue which is optionally interrupted once or more than once by an oxygen atom; and
  ii. at least one solvent comprising a linear, cyclic or branched, partially fluorinated (poly)ether;
b) contacting at least part of the substrate with the composition of step a);
c) at least partially removing the at least one solvent; and
d) optionally, when the fluoropolymer is curable, subjecting the fluoropolymer to curing, wherein the curing step may be carried out simultaneously with or after step c).

According to another aspect, the present disclosure is directed to an article comprising a substrate and at least one fluoropolymer layer comprising a fluoropolymer as described above thereon, wherein the substrate comprises an elastomeric material, wherein the fluoropolymer layer has a thickness of less than 1500 micrometres, and wherein the article has a permeation constant of no greater than 70 (g-mm/m²-day), when measured according to the test method described in the experimental section.

In still another aspect, the present disclosure is directed to an assembly comprising a first substrate comprising an elastomeric material, a second substrate comprising a metal, and between the first and the second substrate a coating comprising a fluoropolymer as described above.

According to yet another aspect, the present disclosure relates to the use of a fluoropolymer as described above for reducing the permeation or for enhancing the solvent swell resistance and/or the chemical resistance of an article comprising an elastomeric material.

DETAILED DESCRIPTION

According to a first aspect, the present disclosure relates to a method of treating a substrate comprising an elastomeric material, wherein the method comprises the steps of:

a) providing a composition comprising:
   i. at least one fluoropolymer which is a copolymer comprising at least 90% by weight, based on the total weight of the copolymer (which is 100% by weight), of units derived from tetrafluoroethene (TFE) and from one or more perfluorinated alkyl ethers corresponding to the general formula (I):

wherein n is 1 or 0 and $R_{fl}$ represents a perfluoroalkyl residue which is optionally interrupted once or more than once by an oxygen atom; and
   ii. at least one solvent comprising a linear, cyclic or branched, partially fluorinated (poly)ether;
b) contacting at least part of the substrate with the composition of step a);
c) at least partially removing the at least one solvent; and
d) optionally, when the fluoropolymer is curable, subjecting the fluoropolymer to curing, wherein the curing step may be carried out simultaneously with or after step c).

In the context of the present disclosure, it has surprisingly been found that a method as described above, allows making fluoropolymer coating compositions having a relatively high content of fluoropolymer, in particular fluoropolymer coating compositions suitable for forming thin fluoropolymer coating layers on substrates comprising an elastomeric material, whilst maintaining excellent coating viscosity characteristics.

It has further been discovered that method as described above provides a cost-effective way for imparting a substrate comprising an elastomeric material with enhanced properties, including in particular reduced permeation (to fuels and solvents), enhanced solvent swell resistance, enhanced chemical resistance, enhanced thermal resistance.

Without wishing to be bound by theory, it is believed that this very unique combination of advantageous properties is due in particular to the specific combination of the fluoropolymer and the fluorinated (poly)ether solvent as described above.

Before any particular executions of this disclosure are explained in detail, it is to be understood that the disclosure is not limited in its application to the details of construction and the arrangement of components set forth in the following description. The invention is capable of other embodiments and of being practiced or of being carried out in various ways. Also, it is to be understood that the phraseology and terminology used herein is for the purpose of description. Contrary to the use of "consisting", the use of "including," "containing", "comprising," or "having" and variations thereof is meant to encompass the items listed thereafter and equivalents thereof as well as additional items. The use of "a" or "an" is meant to encompass "one or more". Any numerical range recited herein describing a physical property or a concentration is intended to include all values from the lower value to the upper value of that range and including the endpoints. For example, a concentration range of from 1% to 50% is intended to be an abbreviation and to expressly disclose the values between the 1% and 50%, such as, for example, 2%, 40%, 10%, 30%, 1.5%, 3.9% and so forth.

Unless indicated otherwise the total amounts of ingredients of a composition expressed as percentage by weight of that composition add up to 100%, i.e. the total weight of the composition is always 100% by weight unless stated otherwise.

Unless indicated otherwise the total amounts of ingredients of a composition expressed as percentage by mole of that composition add up to 100%. i.e. the total amount of moles of the composition is always 100% by mole unless stated otherwise.

As used herein the term "partially fluorinated alkyl" means an alkyl group of which some but not all hydrogens bonded to the carbon chain have been replaced by fluorine. For example, an $F_2HC-$, or an $FH_2C-$ group is a partially fluorinated methyl group. Alkyl groups where the remaining hydrogen atoms have been partially or completely replaced by other atoms, for example other halogen atoms like chlorine, iodine and/or bromine are also encompassed by the term "partially fluorinated alkyl" as long as at least one hydrogen has been replaced by a fluorine. For example, residue of the formula $F_2ClC-$ or $FHClC-$ are also partially fluorinated alkyl residues.

A "partially fluorinated ether" as used herein is an ether containing at least one partially fluorinated group, or an ether that contains one or more perfluorinated groups and at least one non-fluorinated or at least one partially fluorinated group. For example, $F_2HC-O-CH_3$, $F_3C-O-CH_3$, $F_2HC-O-CFH_2$, and $F_2HC-O-CF_3$ are examples of partially fluorinated ethers. Ether groups where the remaining hydrogen atoms have been partially or completely replaced by other atoms, for example other halogen atoms like chlorine, iodine and/or bromine are also encompassed by the term "partially fluorinated alkyl" as long as at least one hydrogen has been replaced by a fluorine. For example, ethers of the formula $F_2ClC-O-CF_3$ or $FHClC-O-CF_3$ are also partially fluorinated ethers.

The term "perfluorinated alkyl" or "perfluoro alkyl" is used herein to describe an alkyl group where all hydrogen atoms bonded to the alkyl chain have been replaced by fluorine atoms. For example, $F_3C-$ represents a perfluoromethyl group.

A "perfluorinated ether" is an ether of which all hydrogen atoms have been replaced by fluorine atoms. An example of a perfluorinated ether is $F_3C-O-CF_3$.

The fluoropolymer compositions provided herein are suitable for coating substrates and may be as coating compositions, i.e. compositions for coating substrates. They may be formulated to have different viscosities depending on solvent and fluoropolymer content and the presence or absence of optional additives. They typically contain or are solutions of fluoropolymers and may be in the form of liquids or pastes. Nevertheless, the compositions may contain dispersed or suspended materials but these materials preferably are additives and not fluoropolymers of the type as described herein. Preferably, the compositions are liquids and more preferably they are solutions containing one or more fluoropolymers as described herein dissolved in a solvent as described herein.

The fluoropolymer compositions provided herein are suitable for coating substrates and may be adjusted in their viscosity to allow them to be applied by different coating methods, including, but not limited to spray coating or printing (for example but not limited to ink-printing, 3D-printing, screen printing), painting, impregnating, roller coating, bar coating, dip coating and solvent casting.

The fluoropolymer compositions may be liquids. The liquids may have, for example, a viscosity of less than 2,000 mPas at room temperature (20° C.+/−2° C.). In one embodiment the compositions are pastes. The pastes may have, for example, a viscosity of from 2,000 to 100.000 mPas at room temperature (20° C.+/−2° C.).

The fluoropolymers for the fluoropolymer compositions according to the present disclosure are copolymers and comprise predominantly, or exclusively, repeating units derived from two or more perfluorinated comonomers. "Predominantly" as used herein means at least 90% by weight, based on the total weight of the copolymer, The fluoropolymers for use herein are copolymers comprising at least 90% by weight, based on the total weight of the copolymer (which is 100% by weight), of units derived from tetrafluoroethene (TFE) and from one or more perfluorinated alkyl ethers corresponding to the general formula (I):

$$R_{f1}\text{—O—}(CF_2)_n\text{—CF}=CF_2 \quad (I)$$

wherein n is 1 (allyl, ether) or 0 (vinyl ether) and $R_{f1}$ represents a perfluoroalkyl residue which is optionally interrupted once or more than once by an oxygen atom.

It is herewith specified that the expression "copolymers comprising at least 90 wt % by weight, based on the total weight of the copolymer (which is 100% by weight), of units derived from tetrafluoroethene (TFE) and from one or more perfluorinated alkyl ethers corresponding to the general formula (I)", is meant to express that the corresponding copolymers comprise at least 90% by weight of the sum of units derived from tetrafluoroethene (TFE) and units derived from one or more perfluorinated alkyl ethers corresponding to the general formula (I), taken in combination.

In a particular aspect of the disclosure, the fluoropolymer for use herein comprises at least 95% by weight, or even at least 97% by weight, of units derived from tetrafluoroethene (TFE) and from one or more perfluorinated alkyl ethers corresponding to the general formula (I), based on the total weight of the copolymer (which is 100% by weight).

In a typical aspect, the perfluoroalkyl residue $R_{f1}$ comprises no greater than 10 carbon atoms, no greater than 8 carbon atoms, no greater than 6 carbon atoms, no greater than 5 carbon atoms, or even no greater than 3 carbon atoms.

The perfluoroalkyl residue $R_{f1}$ may comprise up to 10 carbon atoms, e.g. 1, 2, 3, 4, 5, 6, 7, 8, 9 or 10 carbon atoms. Preferably $R_{f1}$ comprises up to 8, more preferably up to 6 carbon atoms and most preferably 3 or 4 carbon atoms. In one aspect, the residue $R_{f1}$ has 3 carbon atoms. In another aspect, $R_{f1}$ has 1 carbon atom. The perfluoroalkyl residue $R_{f1}$ may be linear, branched and it may contain or not contain a cyclic unit. Specific examples of perfluoroalkyl residues $R_{f1}$ include residues with one or more ether functions including but not limited to:

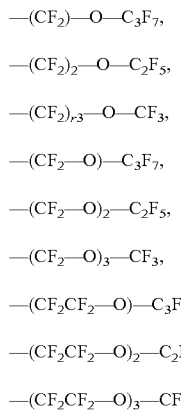

—(CF$_2$)—O—C$_3$F$_7$,

—(CF$_2$)$_2$—O—C$_2$F$_5$,

—(CF$_2$)$_{r-3}$—O—CF$_3$,

—(CF$_2$—O)—C$_3$F$_7$,

—(CF$_2$—O)$_2$—C$_2$F$_5$,

—(CF$_2$—O)$_3$—CF$_3$,

—(CF$_2$CF$_2$—O)—C$_3$F$_7$,

—(CF$_2$CF$_2$—O)$_2$—C$_2$F$_5$,

—(CF$_2$CF$_2$—O)$_3$—CF$_3$

Other specific examples of perfluoroalkyl residues $R_{f1}$ include residues that do not contain an ether function and include but are not limited to —C$_4$F$_9$, —C$_3$F$_7$, —C$_2$F$_5$, —CF$_3$, wherein the C$_4$ and C$_3$ residues may be branched or linear, but preferably are linear.

According to an advantageous aspect, the fluoropolymer for use in the present disclosure comprises units derived from one or more perfluorinated alkyl ethers selected from the group consisting of perfluorinated alkyl vinyl ethers (PAVE's), perfluorinated alkyl allyl ethers (PAAE's), and any combinations or mixtures thereof.

Specific examples of suitable perfluorinated alkyl vinyl ethers (PAVE's) include but are not limited to, perfluorinated methyl vinyl ether (PMVE), perfluorinated ethyl vinyl ether (PEVE), perfluorinated (n-propyl vinyl) ether (PPVE-1), perfluorinated 2-propoxypropylvinyl ether (PPVE-2), perfluorinated 3-methoxy-n-propylvinyl ether, perfluorinated 2-methoxy-ethylvinyl ether, $CF_2=CF\text{—O—}CF_2\text{-O—}C_2F_5$, $CF_2=CF\text{—O—}CF_2\text{—O—}C_3F_7$, $CF_3\text{—}(CF_2)_2\text{—O—}CF(CF_3)\text{—}CF_2\text{—O—}CF(CF_3)\text{—}CF_2\text{—O—}CF=CF_2$, and any combinations or mixtures thereof.

Specific examples of suitable perfluorinated alkyl allyl ethers (PAAEs) include but are not limited to, perfluorinated methyl allyl ether (PMAE), perfluorinated ethyl allyl ether (PEAE), perfluorinated (n-propyl allyl) ether (PPAE-1), perfluorinated 2-propoxypropyl allyl ether (PPAE-2), perfluorinated 3-methoxy-n-propyl allyl ether, perfluorinated 2-methoxy-ethyl allyl ether, $CF_2=CF\text{—}CF_2\text{—O—}CF_3$, $CF_2=CF\text{—}CF_2\text{—O—}C_3F_7$, $CF_2=CF\text{—}CF_2\text{—O—}(CF_3)_3\text{—O—}CF_3$, and any combinations or mixtures thereof.

Further examples of suitable perfluorinated alkyl ethers for use herein include but are not limited to the vinyl ether described in European patent application EP 1 997 795 A1 (Navarrini). Perfluorinated alkyl ethers as described above are commercially available, for example from Anles Ltd. St. Petersburg, Russia and other companies or may be prepared according to methods described in U.S. Pat. No. 4,349,650 (Krespan) or European patent application 1 997 795 A1 (Navarrini) or by modifications thereof as known to the skilled person.

In an exemplary aspect, the fluoropolymers for use herein comprise at least 25% by weight, at least 30% by weight, at least 35% by weight, at least 40% by weight, at least 45% by weight, or even at least 50% by weight, of units derived from TFE, based on the total weight of the copolymer.

According to a typical aspect, the fluoropolymers for use herein comprise from 25 to 90% by weight of units derived from TFE, based on the total weight of the copolymer.

In another exemplary aspect, the fluoropolymers for use herein may comprise from 10 to 75% by weight of units derived from perfluorinated alkyl ethers corresponding to general formula (I), and typically from 0 to 10% by weight of other monomer units, based on the total weight of the copolymer. Exemplary other monomer units for use herein include, but are not limited to, chain transfer agents, modifiers, and any combinations thereof.

According to a typical aspect, the fluoropolymers for use in the present disclosure comprise from 25 to 90% by weight of units derived from TFE, from 10 to 75% by weight of units derived from perfluorinated alkyl ethers corresponding to general formula (I) (in particular PAVE and/or PAAE) and from 0 to 10% by weight of other monomer units, based on the total weight of the copolymer.

As will be apparent to those skilled in the art, the amount of the various monomer units present in the fluoropolymer will be chosen such that the total % by weight of these monomer units equates to 100% by weight of the fluoropolymer. Also, the amount of the various monomer units present in the fluoropolymer will be chosen such that the resulting copolymer has the desired properties.

The molar ratio of units derived from TFE to the perfluorinated alkyl ethers described above may be, for example, from 1:1 to 4:1.

According to one particular aspect, the fluoropolymer for use herein comprises at least 50 mol %, at least 55 mol %, at least 60 mol %, at least 65 mol %, or even at least 70 mol %, based on the total monomer units present in the fluoropolymer, of units derived from tetrafluoroethene (TFE).

According to another particular aspect, the fluoropolymer for use herein comprises from 50 to 90 mol %, from 55 to 90 mol %, from 55 to 85 mol %, from 60 to 85 mol %, or even from 65 to 80 mol %, based on the total monomer units present in the fluoropolymer, of units derived from tetrafluoroethene (TFE).

In still another particular aspect, the fluoropolymer for use herein comprises from 10 to 50 mol %, from 10 to 45 mol %, from 15 to 45 mol %, from 15 to 40 mol %, from 15 to 35 mol %, or even from 20 to 35 mol %, based on the total monomer units present in the fluoropolymer, of units derived from one or more perfluorinated alkyl ethers.

According to a further aspect of the present disclosure, the method of treating a substrate comprising an elastomeric material, comprises the steps of:
a) providing a composition comprising:
   i. at least one fluoropolymer which is a copolymer comprising at least 90 mol %, based on the total moles of monomer units incorporated into the copolymer (which is 100 mol %), of units derived from tetrafluoroethene (TFE) and from one or more perfluorinated alkyl ethers corresponding to the general formula (I):

$$R_{f1}-O-(CF_2)_n-CF=CF_2 \qquad (I)$$

wherein n is 1 or 0 and $R_{f1}$ represents a perfluoroalkyl residue which is optionally interrupted once or more than once by an oxygen atom; and
   ii. at least one solvent comprising a linear, cyclic or branched, partially fluorinated (poly)ether;
b) contacting at least part of the substrate with the composition of step a);
c) at least partially removing the at least one solvent; and
d) optionally, when the fluoropolymer is curable, subjecting the fluoropolymer to curing, wherein the curing step may be carried out simultaneously with or after step c).

According to another particular aspect, the fluoropolymer for use herein comprises at least 90 mol %, at least 95 mol %, or even at least 97 mol %, of units derived from tetrafluoroethene (TFE) and from one or more perfluorinated alkyl ethers corresponding to the general formula (I), based on the total moles of monomer units incorporated into the copolymer (which is 100 mol %).

The fluoropolymers for use herein may be thermoplastic but, in a preferred aspect, the fluoropolymer is an elastomer. Elastomers are typically amorphous.

According to a typical aspect, the fluoropolymer for use herein is selected from the group of elastomeric fluoropolymers, wherein the elastomeric fluoropolymer has in particular a Tg of less than 26° C., less than 20° C., less than 10° C., or even less than 0° C., when measured by DSC according to the test method described in the experimental section.

Typically, the (elastomeric) fluoropolymer for use herein has a Tg in a range from −100° C. to 25° C., from −80° C. to 20° C., from −60° C. to 20° C., from −55° C. to 20° C., from −50° C. to 20° C., from −50° C. to 15° C., from −45° C. to 15° C., from −45° C. to 10° C., or even from −40° C. to 10° C., when measured by DSC according to the test method described in the experimental section.

According to another typical aspect, the (elastomeric) fluoropolymer for use herein has a Mooney viscosity (ML 1+10 at 121° C.) in a range from 1 to 150, from 2 to 150, from 10 to 100, or even from 20 to 70 when measured according to the test method described in the experimental section.

In an advantageous aspect of the present disclosure, the fluoropolymer for use herein has a fluorine content in a range from 67 to 75% by weight, or even from 69 to 73% by weight, based on the total weight of the copolymer (which is 100% by weight). The fluorine content may be achieved by selecting the comonomers and their amounts accordingly. It can be determined as nominal fluorine content by determining the amount of monomers and calculating their fluorine content by excluding contributions to the fluorine content from other components like, for example, cure site monomers, modifiers and chain transfer agents (CTA's).

According to a preferred aspect of the present disclosure, the fluoropolymer for use herein is curable and comprises in particular one or more cure units derived from one or more types of cure-site monomers. More preferably, the fluoropolymer for use herein is a curable elastomer comprising one or more cure-sites. Cure sites are functional groups that react in the presence of a curing agent or a curing system to cross-link the polymers. The cure sites are typically introduced by copolymerizing cure-site monomers, which are functional comonomers already containing the cure sites or precursors thereof.

In a particularly preferred aspect, the curable fluoropolymer for use herein is a curable perfluoroelastomer, for example a perfluoroelastomer of the FFKM-type as known in the art. A perfluoroelastomer comprises repeating units exclusively derived from the perfluorinated comonomers but may contain units derived from cure-site monomers, and modifying monomers if desired. The cure-site monomers and modifying monomers may be partially fluorinated, not fluorinated or perfluorinated and preferably are perfluorinated.

According to a beneficial aspect, the curable fluoropolymer compositions for use herein comprise one or more curing systems for curing the curable fluoropolymers, in particular fluoroelastomers, as described herein. However, protective coatings may be achieved already by applying the fluoropolymers to the substrate and removing the solvent, for example by drying. Curing may not be required to achieve a sufficient protective coating but may be required to provide or increase the mechanical properties of the coating. Therefore, in one aspect of the present disclosure, the fluoropolymer compositions do not comprise a curing agent or curing system. In another aspect, the fluoropolymer compositions comprise a curable fluoroelastomer and comprise a curing agent or curing system.

In a typical aspect, the comonomers are advantageously used in amounts to generate a curable fluoropolymer with the properties described herein, for example having a glass transition temperature (Tg) as described above, for example of less than 20° C. and/or a fluorine content of between 69 and 73% by weight (based on the total weight of the copolymer). Typically, the preferred perfluoroelastomers comprise repeating units exclusively derived from TFE and one or more PAVE, PAAE or a combination thereof. The copolymerized perfluorinated ether units may constitute from about 10 to about 50 mol %, preferably from about 15 to about 35 mol % of total monomer units present in the polymer.

The fluoropolymers for use herein may have a monomodal or bi-modal or multi-modal weight distribution. The fluoropolymers may or may not have a core-shell structure. Core-shell polymers are polymers where towards the end of the polymerization, typically after at least 50% by mole of the comonomers are consumed, the comonomer composition or the ratio of the comonomers or the reaction speed is altered to create a shell of different composition.

The fluoropolymers for use herein can be prepared by methods commonly known in the art, such as bulk, suspension, solution or aqueous emulsion polymerization. For example, the polymerization process can be carried out by free radical polymerization of the monomers alone or as solutions, emulsions, or dispersions in an organic solvent or water. Seeded polymerizations may or may not be used. Curable fluoroelastomers that can be used also include commercially available fluoroelastomers, in particular perfluoroelastomers. The curable fluoropolymers used may typically have an onset of cure (Ts2) of less than 1 minute at 180° C.

In a typical aspect, the composition for use in the present disclosure comprises the fluoropolymer in an amount ranging from 0.01 to 55% by weight, from 0.01 to 50% by weight, from 0.01 to 45% by weight, from 0.1 to 45% by weight, from 1 to 45% by weight, from 5 to 45% by weight, from 10 to 45% by weight, or even from 10 to 40% by weight, based on the total weight of the composition.

In another typical aspect, the composition for use in the present disclosure comprises the fluoropolymer in an amount ranging from 0.01 to 5% by weight, based on the total weight of the composition.

According to the advantageous aspect of the disclosure according to which the fluoropolymers for use herein are curable fluoropolymers, these typically comprise at least one or more cure sites. The cure sites react with a curing agent or a curing system by which the polymers are cross-linked (cured). The curable elastomers may be, for example, peroxide curable and contain cure sites that are reactive to a peroxide curing system. The cure sites may be introduced into the polymer by using cure site monomers, i.e. functional monomers as will be described below, functional chain-transfer agents and starter molecules. Instead or in addition to peroxide-curable cure sites, the fluoroelastomers may contain cure sites that are reactive to other curing systems. An example widely used in the art include cure sites containing nitrile or nitrile groups. Such cure sites are reactive, for example, to curing systems that generate ammonia, as well as peroxide cure.

Suitable cure sites comprise iodine atoms. Iodine-containing cure site end groups can be introduced by using an iodine-containing chain transfer agent in the polymerization. Iodine-containing chain transfer agents will be described below in greater detail. In addition, halogenated redox systems as described below may be used to introduce iodine end groups.

The curable fluoroelastomers may also contain cure sites in the back bone or as pending groups in addition or as an alternative to the cure sites at a terminal position. Cure sites within the polymer backbone can be introduced by using a suitable cure-site monomer. Cure site monomers are monomers containing one or more functional groups that can act as cure sites or, less preferred, contain a precursor that can be converted into a cure site.

In addition to iodine cures sites, other cure sites may also be present, for example Br-containing cure sites or cure sites containing one or more nitrile groups. Br-containing cure sites may be introduced by Br-containing cure-site monomers. Nitrile-containing cure sites are typically introduced by cure site monomers containing a nitrile group.

Examples of cure-site comonomers include for instance:
(a) bromo- or iodo-(per)fluoroalkyl-(per)fluorovinylethers, for example including those having the formula (IV):

$$ZRf—O—CX=CX_2 \quad (IV)$$

wherein each X may be the same or different and represents H or F, Z is Br or I, Rf is a C1-C12 (per)fluoroalkylene, optionally containing chlorine and/or ether oxygen atoms. Suitable examples include $ZCF_2—O—CF=CF_2$, $ZCF_2CF_2—O—CF=CF_2$, $ZCF_2CF_2CF_2—O—CF=CF_2$, $CF_3CFZCF_2—O—CF=CF_2$ or $ZCF_2CF_2—O—CF_2CF_2CF_2—O—CF=CF_2$ wherein Z represents Br of I; and (b) bromo- or iodo perfluoroolefins such as those having the formula (V):

$$Z'—(Rf)r-CX=CX_2 \quad (V)$$

wherein each X independently represents H or F, Z' is Br or I, Rf is a $C_1$-$C_{12}$ perfluoroalkylene, optionally containing chlorine atoms and r is 0 or 1; and (c) non-fluorinated bromo and iodo-olefins such as vinyl bromide, vinyl iodide, 4-bromo-1-butene and 4-iodo-1-butene.

Specific examples include but are not limited to compounds according to (b) wherein X is H, for example compounds with X being H and Rf being a C1 to C3 perfluoroalkylene. Particular examples include: bromo- or iodo-trifluoroethene, 4-bromo-perfluorobutene-1, 4-iodo-perfluorobutene-1, or bromo- or iodo-fluoroolefins such as 1-iodo,2,2-difluroroethene, 1-bromo-2,2-difluoroethene, 4-iodo-3,3,4,4,-tetrafluorobutene-1 and 4-bromo-3,3,4,4-tetrafluorobutene-1; 6-iodo-3,3,4,4,5,5,6,6-octafluorohexene-1.

Typically, the amount of iodine or bromine or their combination in the fluoropolymer is between 0.001 and 5%, preferably between 0.01 and 2.5%, or 0.1 to 1% or 0.2 to 0.6% by weight with respect to the total weight of the fluoropolymer. In one embodiment the curable fluoropolymers contain between 0.001 and 5%, preferably between 0.01 and 2.5%, or 0.1 to 1%, more preferably between 0.2 to 0.6% by weight of iodine based on the total weight of the fluoropolymer.

In addition to the I- and/or Br-cure sites described above, or as an alternative, the curable fluoropolymers may contain nitrile-containing cure sites. Nitrile-containing cure sites may be reactive to other cure systems for example, but not limited to, bisphenol curing systems, peroxide curing systems or triazine curing systems. Examples of nitrile containing cure site monomers correspond to the following formulae:

$$CF_2=CF—CF_2—O—Rf—CN;$$

$$CF_2=CFO(CF_2)_rCN;$$

$$CF_2=CFO[CF_2CF(CF_3)O]_p(CF_2)_vOCF(CF_3)CN;$$

$$CF_2=CF[OCF_2CF(CF_3)]_kO(CF_2)_uCN;$$

wherein, r represents an integer of 2 to 12; p represents an integer of 0 to 4; k represents 1 or 2; v represents an integer of 0 to 6; u represents an integer of 1 to 6, Rf is a perfluoroalkylene or a bivalent perfluoroether group. Specific examples of nitrile containing fluorinated monomers include but are not limited to perfluoro (8-cyano-5-methyl-3,6-dioxa-1-octene), $CF_2=CFO(CF_2)_5CN$, and $CF_2=CFO(CF_2)_3OCF(CF_3)CN$.

The amount of units derived from cure site comonomers depends on the desired cross-linking density. Cure site monomers may be used in amounts of 0 to 10% by weight, typically in amounts of less than 10% by weight or even less than 5% by weight based on the total amount of comonomers used.

The fluoroelastomers may also be of dual cure type. They may also contain different cure sites that are reactive to different curing systems.

It is contemplated that by using halogenated chain transfer agents, terminal cure sites may be introduced. Chain transfer agents are compounds capable of reacting with the propagating polymer chain and terminating the chain propagation. Examples of chain transfer agents reported for the production of fluoroelastomers include those having the formula $RI_x$, wherein R is an x-valent fluoroalkyl or fluoroalkylene radical having from 1 to 12 carbon atoms, which, may be interrupted by one or more ether oxygens and may also contain chlorine and/or bromine atoms. R may be Rf and Rf may be an x-valent (per)fluoroalkyl or (per)fluoroalkylene radical that may be interrupted once or more than once by an ether oxygen. Examples include alpha-omega diiodo alkanes, alpha-omega diiodo fluoroalkanes, and alpha-omega diiodoperfluoroalkanes, which may contain one or more catenary ether oxygens. "Alpha-omega" denotes that the iodine atoms are at the terminal positions of the molecules. Such compounds may be represented by the general formula X—R—Y with X and Y being I and R being as described above. Specific examples include di-iodomethane, alpha-omega (or 1,4-) diiodobutane, alpha-omega (or 1,3-) diiodopropane, alpha-omega (or 1,5-) diiodopentane, alpha-omega (or 1,6-) diiodohexane and 1,2-diiodoperfluoroethane. Other examples include fluorinated di-iodo ether compounds of the following formula (VI):

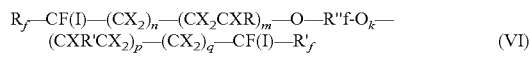

$R_f$—CF(I)—$(CX_2)_n$—$(CX_2CXR)_m$—O—$R''_f$-$O_k$—$(CXR'CX_2)_p$—$(CX_2)_q$—CF(I)—$R'_f$ (VI)

wherein X is independently selected from F, H, and Cl; Rf and $R'_f$ are independently selected from F and a monovalent perfluoroalkane having 1-3 carbons; R is F, or a partially fluorinated or perfluorinated alkane comprising 1-3 carbons; $R''_f$ is a divalent fluoroalkylene having 1-5 carbons or a divalent fluorinated alkylene ether having 1-8 carbons and at least one ether linkage; k is 0 or 1; and n, m, and p are independently selected from an integer from 0-5, wherein, n plus m at least 1 and p plus q are at least 1.

The fluoropolymer compositions provided herein may contain, in an advantageous aspect, one or more curing system for curing the curable fluoropolymer, in particular fluoroelastomer, including for example a peroxide cure system. Other cure systems include, but are not limited to nitrogen-based cure systems as will be described below.

The peroxide cure systems typically include an organic peroxide. The peroxide will cause curing of the fluorinated polymer to form a cross-linked (cured) fluoropolymer when activated. Suitable organic peroxides are those which generate free radicals at curing temperatures. Examples include dialkyl peroxides or bis(dialkyl peroxides), for example. a di-tertiarybutyl peroxide having a tertiary carbon atom attached to the peroxy oxygen. Specific examples include 2,5-dimethyl-2,5-di(tertiarybutylperoxy)hexyne-3 and 2,5-dimethyl-2,5-di(tertiarybutylperoxy)hexane; dicumyl peroxide, dibenzoyl peroxide, tertiarybutyl perbenzoate, alpha, alpha'-bis(t-butylperoxy-diisopropylbenzene), and di[1,3-dimethyl-3-(t-butylperoxy)-butyl]carbonate. Generally, about 1 to 5 parts of peroxide per 100 parts of fluoropolymer may be used.

The curing agents may also be present on carriers, for example silica containing carriers. A peroxide cure system may also include in addition one or more coagent. Typically, the coagent includes a polyunsaturated compound which is capable of cooperating with the peroxide to provide a useful cure. These coagents may typically be added in an amount between 0.1 and 10 parts per hundred parts fluoropolymer, preferably between 2 and 5 parts per hundred parts fluoropolymer. Examples of useful coagents include triallyl cyanurate; triallyl isocyanurate; triallyl trimellitate; tri(methylallyl)isocyanurate; tris(diallylamine)-s-triazine; triallyl phosphite; (N,N')-diallyl acrylamide; hexaallyl phosphoramide; (N,N,N,N)-tetraalkyl tetraphthalamide; (N,N,N',N-tetraallylmalonamide; trivinyl isocyanurate; 2,4,6-trivinyl methyltrisiloxane; N,N'-m-phenylenebismaleimide; diallylphthalate and tri(5-norbornene-2-methylene)cyanurate. Particularly useful is triallyl isocyanurate.

Suitable curing systems for nitrile cure sites are known in the art and include, but are not limited to amidines, amidoximes and others described in US-A1-2009/0018275 (Campbell et al.), incorporated herein by reference in appropriate part. They may include nitrogen-containing nucleophilic compounds selected from heterocyclic secondary amines; guanidines; compounds which decompose in-situ at a temperature between 40° C. and 330° C. to produce a guanidine; compounds which decompose in-situ at a temperature between 40° C. and 330° C. to produce a primary or secondary amine; nucleophilic compounds of the formula $R_1$—NH—$R_2$, wherein $R_1$ is H—, a $C_1$-$C_{10}$ aliphatic hydrocarbon group, or an aryl group having hydrogen atoms in the alpha positions, $R_2$ is a $C_1$-$C_{10}$ aliphatic hydrocarbon group, an aryl group having hydrogen atoms in the alpha positions, —$CONHR_3$, —$NHCO_2R_3$, or —OH', and $R_3$ is a $C_1$-$C_{10}$ aliphatic hydrocarbon group; and substituted amidines of the formula HN=$CR_4NR_5R_6$, wherein $R_4$, $R_5$, $R_6$ are independently H—, alkyl or aryl groups and wherein at least one of $R_4$, $R_5$ and Re is not H—.

As used herein, "heterocyclic secondary amines" refers to aromatic or aliphatic cyclic compounds which have at least one secondary amine nitrogen contained within the ring. Such compounds include, for example, pyrrole, imidazole, pyrazole, 3-pyrroline, and pyrrolidine.

Guanidines included in this disclosure are compounds derived from guanidine, i.e. compounds which contain the radical, —NHCNHNH—, such as, but not limited to, diphenylguanidine, diphenylguanidine acetate, aminobutylguanidine, biguanidine, isopentylguanidine, di-σ-tolylguanidine, o-tolylbiguanide, and triphenylguanidine.

Compounds which decompose in-situ at a temperature between 40° C. and 330° C. to produce either a primary or secondary amine include, but are not limited to, di- or poly-substituted ureas (e.g. 1,3-dimethyl urea); N-alkyl or -dialkyl carbamates (e.g. N-(tert-butyloxycarbonyl)propylamine); di- or poly-substituted thioureas (e.g. 1,3-dimethyl-thiourea); aldehyde-amine condensation products (e.g. 1,3,5-trimethylhexahydro-1,3,5-triazine); N,N'-dialkyl phthalamide derivatives (e.g. N,N'-dimethylphthalamide); and amino acids.

Illustrative examples of nucleophilic compounds of formula $R_1$—NH—$R_2$ include, but are not limited to, aniline, t-butylcarbazate and $C_1$-$C_{10}$ aliphatic primary amines (such as methylamine). Illustrative examples of substituted amidines of the formula HN=$CR_4NR_5R_6$ include benzamidine and N-phenylbenzamidine.

It is believed that most of these nucleophilic compounds act as curing agents by catalyzing the trimerization of polymer chain bound nitrile groups to form triazine rings, thus crosslinking the fluoroelastomer.

The nitrogen-containing nucleophilic compounds may be used alone or in combination with each other or in combination with other curatives. When used in combination with other curatives the level at which the nitrogen-containing nucleophilic compound may be present is generally from 0.01 to 5 parts nucleophilic compound per 100 parts perfluoroelastomer. Preferably 0.05-3.0 parts nucleophilic compound per 100 parts perfluoroelastomer may be used. Curable perfluoroelastomer compositions containing above 5 parts nucleophilic compound per 100 parts perfluoroelastomer may generally be scorchy and may result in compositions of high Mooney viscosity.

Other curatives that may be used alone or in combination with one or more of the nitrogen-containing curatives described above and are capable of crosslinking the perfluoroelastomer include organotin compounds or certain amino group-containing benzene compounds. Suitable organotin compounds include allyl-, propargyl-, triphenyl- and allenyl tin curatives. Another type of curatives includes bis(aminophenols) and bis(aminothiophenols) of the formulae:

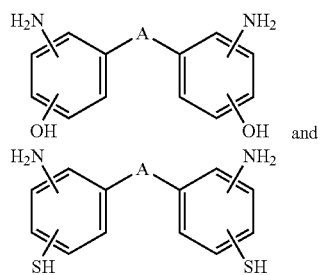

and tetraamines of the formula

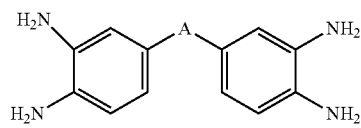

where A is $SO_2$, O, CO, alkyl of 1-6 carbon atoms, perfluoroalkyl of 1-10 carbon atoms, or a carbon-carbon bond linking the two aromatic rings. The amino and hydroxyl groups in formulas XI and XII above, are interchangeably in the meta and para positions with respect to the group A. Preferably, the second curing agent is a compound selected from the group consisting of 2,2-bis[3-amino-4-hydroxyphenyl]hexafluoropropane; 4,4'-sulfonylbis(2-aminophenol); 3,3'-diaminobenzidine; and 3,3',4,4'-tetraaminobenzophenone. The first of these curing agents are referred to as diaminobisphenol AF. The curing agents can be prepared as disclosed in U.S. Pat. No. 3,332,907 to Angelo. Diaminobisphenol AF can be prepared by nitration of 4,4'-[2,2,2-trifluoro-1-(trifluoromethy)ethylidene]bisphenol (i.e. bisphenol AF), preferably with potassium nitrate and trifluoroacetic acid, followed by catalytic hydrogenation, preferably with ethanol as a solvent and a catalytic amount of palladium on carbon as catalyst.

An appropriate level of curatives can be selected by considering cure properties, for example the time to develop maximum moving die rheometer (MDR) torque and minimum Mooney scorch of the curable compositions. The optimum level will depend on the particular combination of perfluoroelastomer and curative and the desired properties of the cured elastomer.

The fluoropolymers for use herein may or may not contain units derived from at least one modifying monomer. The modifying monomers may introduce branching sites into the polymer architecture. Typically, the modifying monomers are bisolefins, bisolefinic ethers or polyethers. The bisolefins and bisolefinic (poly)ethers may be perfluorinated, partially fluorinated or non-fluorinated. Preferably they are perfluorinated. Suitable perfluorinated bisolefinic ethers include those represented by the general formula (VII):

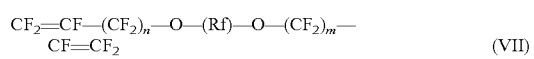

wherein n and m are independent from each other either 1 or 0 and wherein Rf represents a perfluorinated linear or branched, cyclic or acyclic aliphatic or aromatic hydrocarbon residue that may be interrupted by one or more oxygen atoms and comprising up to 30 carbon atoms. A particular suitable perfluorinated bisolefinic ether is a di-vinylether represented by the formula (VIII):

wherein n is an integer between 1 and 10, preferably 2 to 6, e.g. n may be 1, 2, 3, 4, 5, 6 or 7. More preferably, n represents an uneven integer, for example 1, 3, 5 or 7.

Further specific examples include bisolefinic ethers according the general formula (IX):

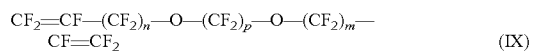

wherein n and m are independently either 1 or 0 and p is an integer from 1 to 10 or 2 to 6. For example, n may be selected to represent 1, 2, 3, 4, 5, 6 or 7, preferably, 1, 3, 5 or 7.

Further suitable perfluorinated bisolefinic ethers can be represented by the formula (X):

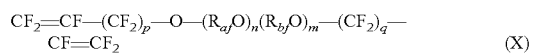

wherein $R_{af}$ and $R_{bf}$ are different linear or branched perfluoroalkylene groups of 1-10 carbon atoms, in particular 2 to 6 carbon atoms, and which may or may not be interrupted by one or more oxygen atoms. $R_{af}$ and/or $R_{bf}$ may also be perfluorinated phenyl or substituted phenyl groups; n is an integer between 1 and 10 and m is an integer between 0 and 10, preferably m is 0. p and q are independent from each other either 1 or 0.

Such modifiers can be prepared by methods known in the art and are commercially available, for example, from Anles Ltd, St. Petersburg, Russia.

Preferably, the modifiers are not used or only used in low amounts. Typical amounts include from 0 to 5%, or from 0 to 1.4% by weight based on the total weight of the polymer. Modifiers may be present, for example, in amounts from about 0.1% to about 1.2% or from about 0.3% to about 0.8% by weight based on the total weight of fluoropolymer.

Although only perfluorinated bisolefinic ethers have been exemplified partially or non-fluorinated homologues may also be used as well as bisolefinic analogues. Combinations of modifiers may also be used.

The fluoropolymers for use herein may contain partially fluorinated or non-fluorinated comonomers and combinations thereof, although this is not preferred. Typical partially fluorinated comonomers include but are not limited to 1,1-difluoroethene (vinylidene fluoride, VDF) and vinyl fluoride (VF) or trifluorochloroethene or trichlorofluoroethene. Examples of non-fluorinated comonomers include but are not limited to ethene and propene. The amounts of units derived from these comonomers include from 0 to 8%, or from 0 to 5, or from 0 to 1% and preferably are 0% (percents by weight, based on the weight of the polymer).

The composition for use herein further comprises at least one solvent comprising a linear, cyclic or branched, partially fluorinated (poly)ether.

Suitable solvents comprising a linear, cyclic or branched, partially fluorinated (poly)ether for use herein will be easily identified by those skilled in the art, in the light of the present disclosure. The solvent is typically capable of dissolving the fluoropolymer.

The solvent for use herein is typically a liquid at ambient conditions and typically has a boiling point of greater than 50° C. Preferably, the solvent has a boiling point below 200° C. so that it can be easily removed.

In an exemplary aspect of the disclosure, the solvent for use herein may be present in an amount of at least 25% by weight based on the total weight of the composition. In another exemplary aspect of the disclosure, the solvent may be present in an amount of from about 25 to 99.99% by weight based on the weight of the composition, for example from about 30 to 95% by weight, or from 50 to 90% by weight.

In one exemplary aspect, the compositions for use herein may contain from about 0.01 to about 55% by weight based on the total weight of the composition of fluoropolymer, or from 0.01 to 45% by weight, or from about 0.1 to about 45% by weight, or from about 10 to 40% by weight based on the weight of the composition. Optimum amounts of solvent and fluoropolymers may depend on the final application and may vary. For example, while trying to produce thin coatings, very dilute solutions of fluoropolymer in the solvent may be desired, for example amounts of from 0.01% by weight to 5% by weight. Also for application in spray coating composition of low viscosity may be preferred over solutions with high viscosity. The concentration of fluoropolymer in the solution affects the viscosity and may be adjusted accordingly. One advantage of the present disclosure is that also solutions with high concentrations of fluoropolymer can be prepared that still provide clear liquid composition of low viscosity, for example compositions containing from about 5 to 55% by weight or from 5 to 25% by weight.

According to an advantageous aspect of the disclosure, the solvent for use herein comprises a branched, partially fluorinated (poly)ether. Preferably, the solvent for use herein comprises a non-fluorinated alkyl group and a perfluorinated alkyl group and more preferably, the perfluorinated alkyl group is branched.

In a preferred aspect of the present disclosure, the partially fluorinated (poly)ether for use herein as a solvent corresponds to the general formula (II):

$$R_{f2}\text{—O—R} \qquad \qquad (II)$$

wherein $R_{f2}$ is a fluoroalkyl residue preferably selected from perfluorinated or partially fluorinated alkyl groups that may be interrupted once or more than once by an ether oxygen and R is preferably selected from partially fluorinated and non-fluorinated alkyl groups. Typically, $R_{f2}$ may have from 1 to 12 carbon atoms. $R_{f2}$ may be a primary, secondary or tertiary fluorinated or perfluorinated alkyl residue. This means, when $R_{f2}$ is a primary alkyl residue, the carbon atom linked to the ether atoms contains two fluorine atoms and is bonded to another carbon atom of the fluorinated or perfluorinated alkyl chain. In such case, $R_{f2}$ would correspond to $R_{f3}$—$CF_2$— and the polyether can be described by the general formula: $R_{f3}$—$CF_2$—O—R.

When $R_{f2}$ is a secondary alkyl residue, the carbon atom linked to the ether atom is also linked to one fluorine atoms and to two carbon atoms of partially and/or perfluorinated alkyl chains and $R_{f2}$ corresponds to $(R_{f4}R_{f5})$CF—. The polyether would correspond to $(R_{f4}R_{f5})$CF—O—R.

When $R_{f2}$ is a tertiary alkyl residue, the carbon atom linked to the ether atom is also linked to three carbon atoms of three partially and/or perfluorinated alkyl chains and Rf corresponds to $(R_{f6}R_{f7}R_{f8})$—C—. The polyether then corresponds to $(R_{f6}R_{f7}R_{f8})$—C—OR. $R_{f3}$; $R_{f4}$; $R_{f5}$; $R_{f6}$; $R_{f7}$; $R_{f8}$ correspond to the definition of R and are a perfluorinated or partially fluorinated alkyl group that may be interrupted once or more than once by an ether oxygen. They may be linear or branched or cyclic. Also, a combination of polyethers may be used and also a combination of primary, secondary and/or tertiary alkyl residues may be used.

According to one preferred aspect of the present disclosure, the partially fluorinated (poly)ether for use herein as a solvent corresponds to the general formula (III):

$$C_pF_{2p+1}\text{—O—}C_qH_{2q+1} \qquad \qquad (III)$$

wherein q is an integer from 1 to 5, for example 1, 2, 3, 4 or 5; and p is an integer from 5 to 11, for example 5, 6, 7, 8, 9, 10 or 11. Preferably, $C_pF_{2p+1}$ is branched. Preferably, $C_pF_{2p+1}$ is branched and q is 1, 2 or 3.

Such solvents are commercially available, for example, under the trade designation NOVEC from 3M Company, St. Paul, USA.

In one advantageous aspect of the disclosure, the composition for use herein comprises at least one solvent comprising a linear, cyclic or branched, partially fluorinated (poly)ether, with the proviso that if the at least one solvent is chosen from linear, partially fluorinated ethers, then the solvent is different from ethoxy-nonafluorobutane.

The partially fluorinated ethers and polyethers may be used alone or they may be present in combination with other solvents, which may be fluorochemical solvents or non-fluorochemical solvents.

According to one typical aspect of the disclosure, the composition for use herein comprises the solvent in an amount of at least 25% by weight, at least 30% by weight, at least 40% by weight, or even at least 50% by weight, based on the total weight of the composition.

According to another typical aspect of the disclosure, the composition for use herein comprises the solvent in an amount of less than 80% by weight, less than 75% by weight, less than 70% by weight, less than 65% by weight, less than 60% by weight, less than 55% by weight, less than 50% by weight, or even less than 45% by weight, based on the total weight of the composition.

According to yet another typical aspect of the disclosure, the composition for use herein comprises the solvent in an amount ranging from 25 to 99.99% by weight, from 30 to 95% by weight, from 40 to 95% by weight, or even from 50 to 90% by weight, based on the total weight of the composition.

Still typically, the composition for use herein comprises the solvent in an amount ranging from 40 to 70% by weight, from 40 to 65% by weight, from 40 to 60% by weight, from 45 to 60% by weight, from 45 to 55% by weight, or even from 45 to 50% by weight, based on the total weight of the composition.

In a further exemplary aspect of the disclosure, the composition for use herein comprises the partially fluorinated (poly)ether in an amount ranging from 25 to 99.99% by weight, from 30 to 95% by weight, from 40 to 95% by weight, or even from 50 to 90% by weight, based on the total weight of the composition.

According to a typical aspect of the method of the disclosure, the composition for use herein is a solution and the method further comprises the step of (at least partially) dissolving the fluoropolymer in the at least one solvent.

According to another typical aspect of the method of the disclosure, the composition for use herein is a coating composition which (directly) results from step c) or from the optional step d) of the method as described above.

The compositions comprising a fluoropolymer may further contain additives as known in the art. Examples include acid acceptors. Such acid acceptors can be inorganic or blends of inorganic and organic acid acceptors. Examples of inorganic acceptors include magnesium oxide, lead oxide, calcium oxide, calcium hydroxide, dibasic lead phosphate, zinc oxide, barium carbonate, strontium hydroxide, calcium carbonate, hydrotalcite, etc. Organic acceptors include epoxies, sodium stearate, and magnesium oxalate. Particularly suitable acid acceptors include magnesium oxide and zinc oxide. Blends of acid acceptors may be used as well. The amount of acid acceptor will generally depend on the nature of the acid acceptor used. Typically, the amount of acid acceptor used is between 0.5 and 5 parts per 100 parts of fluorinated polymer.

The fluoropolymer compositions may contain further additives, such as stabilizers, plasticizers, lubricants, fillers, and processing aids typically utilized in fluoropolymer processing or compounding, provided they have adequate stability for the intended service conditions. A particular example of additives includes carbon particles, like carbon black, graphite, soot. Further additives include but are not limited to pigments, for example iron oxides, titanium dioxides. Other additives include but are not limited to clay, silicon dioxide, barium sulphate, silica, glass fibers, or other additives known and used in the art.

The fluoropolymer compositions may be prepared by mixing the fluoropolymer, the optional curing system and optional additives and the solvent. Preferably, the fluoropolymer is first compounded together with other solid ingredients and in particular with the curing system. Compounding can be carried out in conventional rubber processing equipment to provide a solid mixture, i.e. a solid polymer containing the additional ingredients, also referred to in the art as a "compound". Typical equipment includes rubber mills, internal mixers, such as Banbury mixers, and mixing extruders. During mixing the components and additives are distributed uniformly throughout the resulting fluorinated polymer "compound" or polymer sheets. The compound is then preferably comminuted, for example by cutting it into smaller pieces and is then dissolved in the solvent.

Coatings may be prepared by adding the fluoropolymer compositions to a substrate and removing the solvent. In one typical aspect of the disclosure, the coatings can be prepared without curing and the compositions may be free of curing agents. In an alternative aspect, the fluoropolymer compositions contain a curable fluoropolymer and one or more curatives. The compositions may be subjected to curing after the compositions have been applied to the substrate to be coated. Prior to curing, the solvent may be advantageously reduced or completely removed, for example by evaporation, drying or by boiling it off.

Curing may be achieved by the conditions suitable for the curing system and cure sites used. Depending on the cure sites and curing system used curing may be achieved by heat-treating the curable fluoropolymer compositions at elevated temperatures or at room temperature, or by irradiation, for example UV-curing. The curing is carried out at an effective temperature and effective time to create a cured fluoropolymer. Optimum conditions can be tested by examining the fluoropolymer for its mechanical and physical properties. Curing may be carried out under pressure or without pressure in an oven. A post curing cycle at increased temperatures and or pressure may be applied to ensure the curing process is fully completed. Post curing may be typically carried out at a temperature between 170° C. and 250° C. for a period of 0.1 to 24 hours. The curing conditions depend on the curing system used.

The fluoropolymer compositions may be advantageously used for impregnating, printing on (for example by screen printing), or coating substrates comprising an elastomeric material. Typical examples of coating technique include, but not limited to spray coating, painting dip coating, roller coating, bar coating, solvent casting, paste coating. The coating may be colored in case the compositions contains pigments, for example titanium dioxides or black fillers like graphite or soot, or it may be colorless in case pigments or black fillers are absent.

Bonding agents and primers may be used to pretreat the surface of the (elastomeric) substrate before coating. For example, bonding of the coating to metal surfaces may be improved by applying a bonding agent or primer. Examples include commercial primers or bonding agents, for example those commercially available under the trade designation CHEMLOK.

An advantage of the compositions provided herein is that they can be used to prepare coatings of high or low thickness. Another advantage is that more homogenous coatings may be provided allowing for better protection of substrates comprising an elastomeric material for example but not limited against corrosion or chemical degradation.

The substrates for use herein comprise an elastomeric material. In the context of the present disclosure, any elastomeric material commonly known in the art may be used. Suitable elastomeric materials for use herein may be easily identified by those skilled in the art, in the light of the present disclosure.

Suitable elastomeric materials for use herein are typically selected from the group of saturated elastomeric materials, unsaturated elastomeric materials, and any combination or mixtures thereof.

More specifically, exemplary elastomeric materials suitable for use herein include, but are not limited to, hydrocarbon rubbers, such as polyacrylates, polyurethanes, polyamines, polyamides, polyesters, polyethers, hydrocarbon rubbers, such as polyolefins, polyvinyls, polyvinylpyrrolidone, natural rubbers, synthetic rubbers, natural or synthetic polyisoprenes, polybutadienes, chloroprene rubbers, butyl rubbers, halogenated butyl rubbers, styrene-butadiene rubbers, nitrile rubbers, hydrogenated nitrile rubbers, ethylene propylene rubbers, ethylene propylene diene rubbers, epichlorohydrin rubbers, polyether block amides, chlorosulfonated polyethylenes, ethylene vinyl acetates, thermoplastic elastomers, styrene block copolymers, thermoplastic polyolefin elastomers, thermoplastic vulcanizates, thermoplastic polyurethanes, thermoplastic copolyesters, thermoplastic polyamides, ethylene acrylic rubbers; silicone rubbers; fluorosilicone rubbers; fluoroelastomers; perfluoroelastomers; and any combinations or mixtures thereof.

According to an advantageous aspect, the substrate for use herein comprises an elastomeric material comprising a base polymer selected from the group consisting of hydrocarbon rubbers, silicone rubbers, fluorosilicone rubbers, partially fluorinated elastomers, perfluoroelastomers, and any combinations or mixtures thereof.

According to a preferred aspect, the substrate for use herein comprises an elastomeric material comprising a base polymer selected from the group consisting of hydrocarbon rubbers, in particular ethylene acrylic rubbers; silicone rubbers; partially fluorinated elastomers; perfluoroelastomers; and any combinations or mixtures thereof.

The fluoropolymer compositions for use herein may be advantageously used for coating not only substrates comprising an elastomeric material, but also metal substrates.

Accordingly, and in another aspect, the present disclosure is directed to a method of bonding a first substrate comprising an elastomeric material to a second substrate comprising a metal, wherein the method comprises the steps of:
a) providing a composition as described above;
b) contacting at least part of the first substrate with the composition of step a) thereby forming a coating layer onto at least part of the first substrate;
c) contacting at least part of the coating layer of step b) with the second substrate;
d) at least partially removing the at least one solvent, thereby forming a fluoropolymer material between the first substrate and the second substrate; and
e) optionally, subjecting the fluoropolymer material of step d) to curing, when the fluoropolymer material is curable.

According to an alternative aspect of the present disclosure, it is provided a method of bonding a first substrate comprising an elastomeric material to a second substrate comprising a metal, wherein the method comprises the steps of:
a) providing a composition as described above;
b) contacting at least part of the first substrate with the composition of step a) thereby forming a coating layer onto at least part of the first substrate;
c) at least partially removing the at least one solvent, thereby forming a fluoropolymer material onto the first substrate; and
d) optionally, subjecting the fluoropolymer material of step d) to pre-curing, when the fluoropolymer material is curable;
e) contacting at least part of the fluoropolymer material of step c) or d) with the second substrate;
f) optionally, subjecting the fluoropolymer material of step e) to curing, in particular press-curing, when the at least one fluoropolymer material is curable.

In an exemplary aspect of these methods, the metal for use herein is selected from the group consisting of aluminium, steel, chromium, iron, zinc, nickel, copper, titanium, silver, gold, and any combinations, mixtures or alloys thereof. Preferably, the metal for use herein is selected from the group consisting of aluminium, steel, chromium, and any combinations, mixtures or alloys thereof.

According to a further aspect, the present disclosure relates to a method of reducing the permeation (to fuels and solvents) of an article comprising an elastomeric material, wherein the method comprises the step of applying on at least part of the surface of the article a fluoropolymer coating, wherein the fluoropolymer is a copolymer comprising at least 90% by weight, based on the total weight of the copolymer (which is 100% by weight) of units derived from tetrafluoroethene (TFE) and from one or more perfluorinated alkyl ethers corresponding to the general formula (I):

$$R_{f1}\text{—O—}(CF_2)_n\text{—CF}=CF_2 \quad (I)$$

wherein n is 1 or 0 and $R_{f1}$ represents a perfluoroalkyl residue which is optionally interrupted once or more than once by an oxygen atom.

In an advantageous aspect of this method, the permeation constant of the article comprising the fluoropolymer coating is no greater than 70, no greater than 50, no greater than 40, no greater than 30, no greater than 20, no greater than 10, no greater than 5, or even no greater than 0 (g-mm/m²-day), when measured according to the test method described in the experimental section.

According to still a further aspect, the present disclosure is directed to a method of enhancing the solvent swell resistance and/or the chemical resistance of an article comprising an elastomeric material, wherein the method comprises the step of applying on at least part of the surface of the substrate a fluoropolymer coating, wherein the fluoropolymer is as described above.

According to yet a further aspect, the present disclosure relates to a method of enhancing the thermal resistance of an article comprising an elastomeric material, wherein the method comprises the step of applying on at least part of the surface of the substrate a fluoropolymer coating, wherein the fluoropolymer is as described above.

In an advantageous aspect of this method, the thermal resistance of the fluoropolymer coating is maintained up to a temperature greater than 200° C., greater than 250° C., greater than 280° C., greater than 300° C., or even greater than 320° C.

In an exemplary aspect of the methods as described above, those methods comprise the steps of:
a) providing a composition as described above;
b) contacting at least part of the substrate with the composition of step a);
c) at least partially removing the at least one solvent, thereby forming a fluoropolymer material onto the substrate; and
d) optionally, subjecting the fluoropolymer material of step c) to curing, when the fluoropolymer material is curable.

According to another aspect of the present disclosure, it is provided a coated article comprising a substrate comprising an elastomeric material and a coating comprising a fluoropolymer as described above thereon, wherein the coating is obtained from the method as described above.

According to still another aspect, the present disclosure is directed to an article comprising a substrate and at least one fluoropolymer layer comprising a fluoropolymer as described above thereon, wherein the substrate comprises an elastomeric material, wherein the fluoropolymer layer has a thickness of less than 1500 micrometres, and wherein the article has a permeation constant of no greater than 70 (g-mm/m²-day), when measured according to the test method described in the experimental section.

According to yet another aspect, the present disclosure is directed to an article comprising a substrate and at least one fluoropolymer layer comprising a fluoropolymer as described above thereon, wherein the substrate comprises an elastomeric material, wherein the fluoropolymer layer has a thickness of less than 1500 micrometres, and wherein the article has an overall solvent swell decrease factor of at least 2, when measured according to the solvent swell decrease test method described in the experimental section.

In an advantageous aspect of these articles, the fluoropolymer layer has a thickness of less than 1200 micrometres, less than 1000 micrometres, less than 800 micrometres, less than 600 micrometres, less than 400 micrometres, less than 200 micrometres, less than 100 micrometres, less than 80 micrometres, less than 60 micrometres, less than 40 micrometres, or even less than 20 micrometres.

Advantageously, the permeation constant of the article is no greater than 70, no greater than 50, no greater than 40, no greater than 30, no greater than 20, no greater than 10, no greater than 5, or even no greater than 1 (g-mm/m$^2$-day), when measured according to the test method described in the experimental section.

In one beneficial aspect of the disclosure, the overall solvent swell decrease factor of the article is at least 3, at least 5, at least 8, at least 10, at least 12, or even at least 15, when measured according to the solvent swell decrease test method described in the experimental section.

In another beneficial aspect, the overall % volume swell of the article is less than 30%, less than 25%, less than 20%, less than 15%, less than 10%, or even less than 5%, when measured in acetone according to the solvent swell test method described in the experimental section.

The articles of the present disclosure may be advantageously selected from the group consisting of seals or a component thereof, in particular O-rings and gaskets; articles for fluid transportation or a component thereof, in particular hoses, more in particular fuel line hoses and turbo charger hoses; and any combinations thereof.

In a particularly advantageous aspect, the articles of the present disclosure are selected from the group consisting of O-rings, gaskets, fuel line hoses and turbo charger hoses.

According to one exemplary aspect of the articles of the present disclosure, the fluoropolymer layer is obtained from the method of treating a substrate comprising an elastomeric material as described above.

According to still another aspect of the present disclosure, it is provided an assembly comprising a first substrate comprising an elastomeric material, a second substrate comprising a metal, and between the first and the second substrate a coating comprising a fluoropolymer as described above.

In an advantageous aspect, the (fluoropolymer) coating has a thickness of less than 1500 micrometres, less than 1200 micrometres, less than 1000 micrometres, less than 800 micrometres, less than 600 micrometres, less than 400 micrometres, less than 200 micrometres, less than 100 micrometres, less than 80 micrometres, less than 60 micrometres, less than 40 micrometres, or even less than 20 micrometres.

According to one exemplary aspect of the assembly of the present disclosure, the (fluoropolymer) coating/layer is obtained from the method of treating a substrate comprising an elastomeric material as described above.

According to still another aspect, the present disclosure relates to the use of a fluoropolymer as described above for reducing the permeation (to solvent) of an article comprising an elastomeric material.

According to still another aspect, the present disclosure is directed to the use of a fluoropolymer as described above for enhancing the solvent swell resistance and/or the chemical resistance of an article comprising an elastomeric material.

According to still another aspect, the present disclosure relates to the use of a fluoropolymer as described above for enhancing the thermal resistance of an article comprising an elastomeric material.

According to yet another aspect, the present disclosure is directed to the use of a composition as described above for reducing the permeation (to solvent) of an article comprising an elastomeric material.

In yet another aspect, the present disclosure relates to the use of a composition as described above for enhancing the solvent swell resistance and/or the chemical resistance of an article comprising an elastomeric material.

In yet another aspect, the present disclosure is directed to the use of a composition as described above for enhancing the thermal resistance of an article comprising an elastomeric material.

Item 1 is a method of treating a substrate comprising an elastomeric material, wherein the method comprises the steps of:
a) providing a composition comprising:
  i. at least one fluoropolymer which is a copolymer comprising at least 90% by weight, based on the total weight of the copolymer (which is 100% by weight), of units derived from tetrafluoroethene (TFE) and from one or more perfluorinated alkyl ethers corresponding to the general formula (I):

$$R_{f1}\text{—O—}(CF_2)_n\text{—}CF\text{=}CF_2 \quad\quad (I)$$

wherein n is 1 or 0 and $R_{f1}$ represents a perfluoroalkyl residue which is optionally interrupted once or more than once by an oxygen atom; and
  ii. at least one solvent comprising a linear, cyclic or branched, partially fluorinated (poly)ether;
b) contacting at least part of the substrate with the composition of step a);
c) at least partially removing the at least one solvent (thereby forming a fluoropolymer material onto the substrate); and
d) optionally, when the fluoropolymer (material) is curable, subjecting the fluoropolymer (material) to curing, wherein the curing step may be carried out simultaneously with or after step c).

Item 2 is a method according to item 1, wherein the fluoropolymer is selected from the group of elastomeric fluoropolymers, wherein the elastomeric fluoropolymer has in particular a Tg of less than 26° C., less than 20° C., less than 10° C., or even less than 0° C., when measured by DSC according to the test method described in the experimental section.

Item 3 is a method according to item 2, wherein the elastomeric fluoropolymer has a Tg in a range from −100° C. to 25° C., from −80° C. to 20° C., from −60° C. to 20° C., from −55° C. to 20° C., from −50° C. to 20° C., from −50° C. to 15° C., from −45° C. to 15° C., from −45° C. to 10° C., or even from −40° C. to 10° C., when measured by DSC according to the test method described in the experimental section.

Item 4 is a method according to any of item 2 or 3, wherein the elastomeric fluoropolymer has a Mooney viscosity in a range from 1 to 150, from 2 to 150, from 10 to 100, or even from 20 to 70 when measured according to the test method described in the experimental section.

Item 5 is a method according to any of the preceding items, wherein the fluoropolymer is curable and comprises in particular one or more cure units derived from one or more types of cure-site monomers.

Item 6 is a method according to any of the preceding items, wherein the fluoropolymer is in particular an elastomeric fluoropolymer and comprises one or more cure-sites that are reactive to a peroxide curing system.

Item 7 is a method according to any of the preceding items, wherein the fluoropolymer is in particular an elastomeric fluoropolymer and comprises one or more cure-sites selected from the group of cure sites containing nitrile groups, iodine groups, bromine groups and combinations thereof.

Item 8 is a method according to any of the preceding items, wherein the fluoropolymer is in particular an elastomeric fluoropolymer and does not comprise any repeating units derived from a non-fluorinated or partially fluorinated comonomer.

Item 9 is a method according to item 7, wherein the fluoropolymer comprises units derived from a perfluorinated, partially or non-fluorinated cure site monomer and/or units derived from one or more modifier monomers selected from perfluorinated, partially and non-fluorinated bisolefins, bisolefin-ethers and bisolefin polyethers.

Item 10 is a method according to any of the preceding items, wherein the fluoropolymer comprises at least 95% by weight, or even at least 97% by weight, of units derived from tetrafluoroethene (TFE) and from one or more perfluorinated alkyl ethers corresponding to the general formula (I), based on the total weight of the copolymer (which is 100% by weight).

Item 11 is a method according to any of the preceding items, wherein the perfluoroalkyl residue $R_{f1}$ comprises no greater than 10 carbon atoms, no greater than 8 carbon atoms, no greater than 6 carbon atoms, no greater than 5 carbon atoms, or even no greater than 3 carbon atoms.

Item 12 is a method according to any of the preceding items, wherein the perfluoroalkyl residue $R_{f1}$ comprises 3 or 1 carbon atoms.

Item 13 is a method according to any of the preceding items, wherein the units derived from one or more perfluorinated alkyl ethers are selected from the group consisting of perfluorinated alkyl vinyl ethers (PAVE's), in particular from the group consisting of perfluorinated methyl vinyl ether (PMVE), perfluorinated ethyl vinyl ether (PEVE), perfluorinated (n-propyl vinyl) ether (PPVE-1), perfluorinated 2-propoxypropylvinyl ether (PPVE-2), perfluorinated 3-methoxy-n-propylvinyl ether, perfluorinated 2-methoxyethylvinyl ether, $CF_2=CF-O-CF_2-O-C_2F_5$, $CF_2=CF-O-CF_2-O-C_3F_7$, $CF_3-(CF_2)_2-O-CF(CF_3)-CF_2-O-CF(CF_3)-CF_2-O-CF=CF_2$, and any combinations or mixtures thereof.

Item 14 is a method according to any of the preceding items, wherein the units derived from one or more perfluorinated alkyl ethers are selected from the group consisting of perfluorinated alkyl allyl ethers (PAAEs), in particular from the group consisting of perfluorinated methyl allyl ether (PMAE), perfluorinated ethyl allyl ether (PEAE), perfluorinated (n-propyl allyl) ether (PPAE-1), perfluorinated 2-propoxypropyl allyl ether (PPAE-2), perfluorinated 3-methoxy-n-propyl allyl ether, perfluorinated 2-methoxyethyl allyl ether, $CF_2=CF-CF_2-O-CF_3$, $CF_2=CF-CF_2-O-C_3F_7$, $CF_2=CF-CF_2-O-(CF_3)_3-O-CF_3$, and any combinations or mixtures thereof.

Item 15 is a method according to any of the preceding items, wherein the fluoropolymer comprises at least 50 mol %, at least 55 mol %, at least 60 mol %, at least 65 mol %, or even at least 70 mol %, based on the total monomer units present in the fluoropolymer, of units derived from tetrafluoroethene (TFE).

Item 16 is a method according to any of the preceding items, wherein the fluoropolymer comprises from 50 to 90 mol %, from 55 to 90 mol %, from 55 to 85 mol %, from 60 to 85 mol %, or even from 65 to 80 mol %, based on the total monomer units present in the fluoropolymer, of units derived from tetrafluoroethene (TFE).

Item 17 is a method according to any of the preceding items, wherein the fluoropolymer comprises from 10 to 50 mol %, from 10 to 45 mol %, from 15 to 45 mol %, from 15 to 40 mol %, from 15 to 35 mol %, or even from 20 to 35 mol %, based on the total monomer units present in the fluoropolymer, of units derived from one or more perfluorinated alkyl ethers.

Item 18 is a method according to any of the preceding items, wherein the fluoropolymer has a fluorine content in a range from 67 to 75% by weight, based on the total weight of the copolymer (which is 100% by weight).

Item 19 is a method according to any of the preceding items, wherein the composition comprises the fluoropolymer in an amount ranging from 0.01 to 55% by weight, from 0.01 to 50% by weight, from 0.01 to 45% by weight, from 0.1 to 45% by weight, from 1 to 45% by weight, from 5 to 45% by weight, from 10 to 45% by weight, or even from 10 to 40% by weight, based on the total weight of the composition.

Item 20 is a method according to any of the preceding items, wherein the composition comprises the fluoropolymer in an amount ranging from 0.01 to 5% by weight, based on the total weight of the composition.

Item 21 is a method according to any of the preceding items, wherein the solvent comprises a branched, partially fluorinated (poly)ether.

Item 22 is a method according to any of the preceding items, wherein the partially fluorinated (poly)ether corresponds to the general formula (II):

$$R_{f1}-O-R \quad (II)$$

wherein R is a fluoroalkyl residue preferably selected from perfluorinated or partially fluorinated alkyl groups that may be interrupted once or more than once by an ether oxygen and R is preferably selected from partially fluorinated and non-fluorinated alkyl groups.

Item 23 is a method according to item 22, wherein the fluoroalkyl residue $R_{f2}$ is comprises from 1 to 12 carbon atoms.

Item 24 is a method according to any of item 22 or 23, wherein the fluoroalkyl residue $R_{f2}$ is a primary, secondary or tertiary fluorinated or perfluorinated alkyl residue.

Item 25 is a method according to any of the preceding items, wherein the partially fluorinated (poly)ether corresponds to the general formula (III):

$$C_pF_{2p+1}-C_qH_{2q+1} \quad (III)$$

wherein q is an integer from 1 to 5, and p is an integer from 5 to 11.

Item 26 is a method according to item 25, wherein the $C_pF_{2p+1}-$ unit is branched, and q is preferably from 1 to 3.

Item 27 is a method according to any of the preceding items, wherein the composition comprises the solvent in an amount of at least 25% by weight, at least 30% by weight, at least 40% by weight, at least 50% by weight, at least 60% by weight, or even at least 70% by weight, based on the total weight of the composition.

Item 28 is a method according to any items 1 to 27, wherein the composition comprises the solvent in an amount of less than 80% by weight, less than 75% by weight, less than 70% by weight, less than 65% by weight, less than 60% by weight, less than 55% by weight, less than 50% by weight, or even less than 45% by weight, based on the total weight of the composition.

Item 29 is a method according to any of the preceding items, wherein the composition comprises the solvent in an amount ranging from 25 to 99.99% by weight, from 30 to 95% by weight, from 40 to 95% by weight, or even from 50 to 90% by weight, based on the total weight of the composition.

Item 30 is a method according to any of the preceding items, wherein the composition comprises the solvent in an amount ranging from 40 to 70% by weight, from 40 to 65% by weight, from 40 to 60% by weight, from 45 to 60% by weight, from 45 to 55% by weight, or even from 45 to 50% by weight, based on the total weight of the composition.

Item 31 is a method according to any of the preceding items, wherein the composition comprises the partially fluorinated (poly)ether in an amount ranging from 25 to 99.99% by weight, from 30 to 95% by weight, from 40 to 95% by weight, or even from 50 to 90% by weight, based on the total weight of the composition.

Item 32 is a method according to any of the preceding items, wherein the fluoropolymer is in particular an elastomeric fluoropolymer comprising one or more cure-sites, and wherein the composition further comprises at least one curing agent for curing the fluoropolymer.

Item 33 is a method according to item 32, wherein the curing system is selected from the group consisting of peroxide-based curing systems, bisaminophenol and bisphenol AF curing systems, nitrogen-based curing systems, and any combinations or mixtures thereof.

Item 34 is a method according to any of the preceding items, wherein the composition comprises at least one solvent comprising a linear, cyclic or branched, partially fluorinated (poly)ether, with the proviso that if the at least one solvent is chosen from linear, partially fluorinated ethers, then the solvent is different from ethoxy-nonafluorobutane.

Item 35 is a method according to any of the preceding items, wherein the composition is a solution and the method further comprises the step of (at least partially) dissolving the fluoropolymer in the at least one solvent.

Item 36 is a method according to any of the preceding items, wherein the composition is a coating composition which (directly) results from step c) or from the optional step d).

Item 37 is a method according to any of the preceding items, wherein the substrate comprises an elastomeric material selected from the group of saturated elastomeric materials, unsaturated elastomeric materials, and any combination or mixtures thereof.

Item 38 is a method according to any of the preceding items, wherein the substrate comprises an elastomeric material comprising a base polymer selected from the group consisting of hydrocarbon rubbers, including polyacrylates, polyurethanes, polyamines, polyamides, polyesters, polyethers, polyolefins, polyvinyls, polyvinylpyrrolidone, natural rubbers, synthetic rubbers, hydrocarbon rubbers, natural or synthetic polyisoprenes, polybutadienes, chloroprene rubbers, butyl rubbers, halogenated butyl rubbers, styrene-butadiene rubbers, nitrile rubbers, hydrogenated nitrile rubbers, ethylene propylene rubbers, ethylene propylene diene rubbers, epichlorohydrin rubbers, polyether block amides, chlorosulfonated polyethylenes, ethylene vinyl acetates, thermoplastic elastomers, styrene block copolymers, thermoplastic poyolefin elastomers, thermoplastic vulcanizates, thermoplastic polyurethanes, thermoplastic copolyesters, thermoplastic polyamides, ethylene acrylic rubbers; silicone rubbers; fluorosilicone rubbers; partially fluorinated elastomers; perfluoroelastomers; and any combinations or mixtures thereof.

Item 39 is a method according to any of the preceding items, wherein the substrate comprises an elastomeric material comprising a base polymer selected from the group consisting of hydrocarbon rubbers, silicone rubbers, fluorosilicone rubbers, partially fluorinated elastomers, perfluoroelastomers, and any combinations or mixtures thereof.

Item 40 is a method according to any of the preceding items, wherein the substrate comprises an elastomeric material comprising a base polymer selected from the group consisting of hydrocarbon rubbers, in particular ethylene acrylic rubbers; silicone rubbers; partially fluorinated elastomers; perfluoroelastomers; and any combinations or mixtures thereof.

Item 41 is a method of bonding a first substrate comprising an elastomeric material to a second substrate comprising a metal, wherein the method comprises the steps of:
 a) providing a composition as described in any of items 1 to 36;
 b) contacting at least part of the first substrate with the composition of step a) thereby forming a coating layer onto at least part of the first substrate;
 c) contacting at least part of the coating layer of step b) with the second substrate;
 d) at least partially removing the at least one solvent, thereby forming a fluoropolymer material between the first substrate and the second substrate; and
 e) optionally, subjecting the fluoropolymer material of step d) to curing, when the fluoropolymer material is curable.

Item 42 is a method of bonding a first substrate comprising an elastomeric material to a second substrate comprising a metal, wherein the method comprises the steps of:
 a) providing a composition as described in any of items 1 to 36;
 b) contacting at least part of the first substrate with the composition of step a) thereby forming a coating layer onto at least part of the first substrate;
 c) at least partially removing the at least one solvent, thereby forming a fluoropolymer material onto the first substrate; and
 d) optionally, subjecting the fluoropolymer material of step c) to pre-curing, when the fluoropolymer material is curable;
 e) contacting at least part of the fluoropolymer material of step c) or d) with the second substrate;
 f) optionally, subjecting the fluoropolymer material of step e) to curing, in particular press-curing, when the at least one fluoropolymer material is curable.

Item 43 is a method according to any of item 41 or 42, wherein the metal is selected from the group consisting of aluminium, steel, chromium, iron, zinc, nickel, copper, titanium, silver, gold, and any combinations, mixtures or alloys thereof.

Item 44 is a method according to any of items 41 to 43, wherein the metal is selected from the group consisting of aluminium, steel, chromium, and any combinations, mixtures or alloys thereof.

Item 45 is a method of reducing the permeation of an article comprising an elastomeric material, wherein the method comprises the step of applying on at least part of the surface of the article a fluoropolymer coating, wherein the fluoropolymer is a copolymer comprising at least 90% by weight, based on the total weight of the copolymer (which is 100% by weight) of units derived from tetrafluoroethene (TFE) and from one or more perfluorinated alkyl ethers corresponding to the general formula (I):

$$R_{f1}-O-(CF_2)_n-CF=CF_2 \quad (I)$$

wherein n is 1 or 0 and $R_{f1}$ represents a perfluoroalkyl residue which is optionally interrupted once or more than once by an oxygen atom.

Item 46 is a method according to item 45, wherein the permeation constant of the article comprising the fluoropolymer coating is no greater than 70, no greater than 50, no greater than 40, no greater than 30, no greater than 20, no greater than 10, no greater than 5, or even no greater than 0 (g-mm/m$^2$-day), when measured according to the test method described in the experimental section.

Item 47 is a method of enhancing the solvent swell resistance and/or the chemical resistance of an article comprising an elastomeric material, wherein the method comprises the step of applying on at least part of the surface of the substrate a fluoropolymer coating, wherein the fluoropolymer is as described in any of items 1 to 18.

Item 48 is a method of enhancing the thermal resistance of an article comprising an elastomeric material, wherein the method comprises the step of applying on at least part of the surface of the substrate a fluoropolymer coating, wherein the fluoropolymer is as described in any of items 1 to 18.

Item 49 is a method according to any of items 45 to 48, which comprises the steps of:
  a) providing a composition as described in any of items 1 to 36;
  b) contacting at least part of the substrate with the composition of step a);
  c) at least partially removing the at least one solvent, thereby forming a fluoropolymer material onto the substrate; and
  d) optionally, subjecting the fluoropolymer material of step c) to curing, when the fluoropolymer material is curable.

Item 50 is a coated article comprising a substrate comprising an elastomeric material and a coating comprising a fluoropolymer as described in any of items 1 to 18 thereon, wherein the coating is obtained from the method according to any of items 1 to 40.

Item 51 is an article comprising a substrate and at least one fluoropolymer layer comprising a fluoropolymer as described in any of items 1 to 18 thereon, wherein the substrate comprises an elastomeric material, wherein the fluoropolymer layer has a thickness of less than 1500 micrometres, and wherein the article has a permeation constant of no greater than 70 (g-mm/m$^2$-day), when measured according to the test method described in the experimental section.

Item 52 is an article comprising a substrate and at least one fluoropolymer layer comprising a fluoropolymer as described in any of items 1 to 18 thereon, wherein the substrate comprises an elastomeric material, wherein the fluoropolymer layer has a thickness of less than 1500 micrometres, and wherein the article has an overall solvent swell decrease factor of at least 2, when measured according to the solvent swell decrease test method described in the experimental section.

Item 53 is an article according to any of item 51 or 52, wherein the fluoropolymer layer has a thickness of less than 1200 micrometres, less than 1000 micrometres, less than 800 micrometres, less than 600 micrometres, less than 400 micrometres, less than 200 micrometres, less than 100 micrometres, less than 80 micrometres, less than 60 micrometres, less than 40 micrometres, or even less than 20 micrometres.

Item 54 is an article according to any of items 51 to 53, which has a permeation constant of no greater than 70, no greater than 50, no greater than 40, no greater than 30, no greater than 20, no greater than 10, no greater than 5, or even no greater than 1 (g-mm/m$^2$-day), when measured according to the test method described in the experimental section.

Item 55 is an article according to any of items 51 to 54, which has an overall solvent swell decrease factor of at least 3, at least 5, at least 8, at least 10, at least 12, or even at least 15, when measured according to the solvent swell decrease test method described in the experimental section.

Item 56 is an article according to any of items 51 to 55, which has an overall % volume swell of less than 30%, less than 25%, less than 20%, less than 15%, less than 10%, or even less than 5%, when measured in acetone according to the solvent swell test method described in the experimental section.

Item 57 is an article according to any of items 51 to 56, which is selected from the group consisting of seals or a component thereof, in particular O-rings and gaskets; articles for fluid transportation or a component thereof, in particular hoses, more in particular fuel line hoses and turbo charger hoses; and any combinations thereof.

Item 58 is an article according to any of items 51 to 57, wherein the fluoropolymer layer is obtained from the method according to any of items 1 to 40.

Item 59 is an assembly comprising a first substrate comprising an elastomeric material, a second substrate comprising a metal, and between the first and the second substrate a coating comprising a fluoropolymer as described in any of items 1 to 18.

Item 60 is an assembly according to item 58, wherein the coating has a thickness of less than 1500 micrometres, less than 1200 micrometres, less than 1000 micrometres, less than 800 micrometres, less than 600 micrometres, less than 400 micrometres, less than 200 micrometres, less than 100 micrometres, less than 80 micrometres, less than 60 micrometres, less than 40 micrometres, or even less than 20 micrometres.

Item 61 is an assembly according to any of item 58 or 59, wherein the coating is obtained from a method according to any of items 1 to 40.

Item 62 is the use of a fluoropolymer as described in any of items 1 to 18 for reducing the permeation (to solvent) of an article comprising an elastomeric material.

Item 63 is the use of a fluoropolymer as described in any of items 1 to 18 for enhancing the solvent swell resistance and/or the chemical resistance of an article comprising an elastomeric material.

Item 64 is the use of a fluoropolymer as described in any of items 1 to 18 for enhancing the thermal resistance of an article comprising an elastomeric material.

Item 65 is the use of a composition as described in any of items 1 to 36 for reducing the permeation (to fuels and solvents) of an article comprising an elastomeric material.

Item 66 is the use of a composition as described in any of items 1 to 36 for enhancing the solvent swell resistance and/or the chemical resistance of an article comprising an elastomeric material.

Item 67 is the use of a composition as described in any of items 1 to 36 for enhancing the thermal resistance of an article comprising an elastomeric material.

EXAMPLES

The present disclosure is further illustrated by the following examples. These examples are merely for illustrative purposes only and are not meant to be limiting on the scope of the appended claims.

Test Methods Applied:

I-Content:

The iodine content is determined by elemental analysis using an ASC-240 S auto sampler from Enviroscience (Düsseldorf/Germany), an Enviroscience AQF-2100 F combustion unit (software: "NSX-2100, version 1.9.8"; Mitsubishi Chemical Analytech Co., LTD.) an Enviroscience GA-210 gas absorbtion unit and a Metrohm "881 compac IC pro" liquid chromatography analyzer (software: Metrohm "Magic IC Net 2.3").

Glass Transition Temperature (Tg):

The Tg is measured by differential scanning calorimetry using a TA Instruments Q200 modulated DSC. Conditions of measurements are: heating rate from −150° C. to 50° C. at 2-3° C./minute. The modulation amplitude is +/−1° C. per minute during 60 sec. Reported is the midpoint Tg (° C.).

Mooney Viscosity:

Mooney viscosity is determined in accordance with ASTM D1646-07(2012), 1 minute pre-heat and a 10 minute test at 121° C. (ML 1+10 at 121° C.).

Viscosity:

Brookfield viscosity is measured on Brookfield viscometer LV using spindle 3 at room temperature (20-22° C.).

Permeation:

Permeation constant through substrates and coated articles is measured according to test procedure described in SAE Technical Paper series SAE 2000-01-1096, on circular pads having a diameter of approximately 75 mm and a thickness of approximately 1 mm, using standard test fluid Fuel CE10 at 40° C.

Thwing-Albert aluminum cups are filled with 70 g of CE10 test fuel (45/45/10 vol % iso-octane/toluene/ethanol) and assembled. Perfluoroelastomer (PFE) seals are used to minimize vapor transmission through the seals. A 16-mesh screen is placed on top of the test film with another PFE seal in between to prevent any ballooning effect of the test film which would alter film thickness and area. Cap screws on the clamping ring are tightened. Three cups are assembled for each material, and placed upside down in glass beakers who are placed in a hot water bath at 42° C. to achieve a temperature of 40° C. in the cup. Every day, cups are removed from the water bath and allowed to cool down to room temperature and weighed on an analytical balance. The lab air temperature, relative humidity, and barometric pressure are also recorded for air buoyancy corrections to the measured weights.

The weight loss (compared to initial weight) of each cup is plotted vs. time to determine the vapor transmission rate from the slope. Corrections for the effect of air buoyancy on the weight measurements are made. It is apparent that a linear dependence is obtained after a short equilibration time. The slope of each curve is calculated based on data from Day 6 to Day 31 to determine the vapor loss each day (g/day). This value is then multiplied by the film thickness (mm) and divided by the exposed test area ($m^2$) to calculate the permeation constant (g-mm/$m^2$-day).

Permeation is measured on uncoated substrate pads and on substrate pads coated with a cured fluoropolymer coating. The permeation constant is reported in (g-mm/$m^2$-day) and represents the average of three measurements.

Solvent Swell:

The overall % volume swell is measured according to standard test procedure ASTM D471-06 on O-rings samples having a diameter of approximately 25 mm and a thickness of approximately 3.5 mm, using acetone as solvent, and after immersion during 24 hours at 23° C. The volume swell is measured on uncoated O-ring samples and on O-ring samples coated with a cured fluoropolymer coating. The volume swell is calculated as per ASTM D471-06, reported in % and represents the average of three measurements.

The overall solvent swell decrease factor is calculated by dividing the overall % volume swell measured on uncoated O-rings by the overall % volume swell measured on the same O-ring coated with a cured fluoropolymer coating.

Test Substrates used for testing:

VMQ: Silicone rubber plates (100 mm×100 mm×1 mm) are molded from silicone rubber, obtained from Veritas AG, Germany. Circular pads having a diameter of approximately 75 mm and a thickness of approximately 1 mm are cut from the plates.

FKM: Product FPO 3731, a high fluorine peroxide curable terpolymer, commercially available from 3M Company, St. Paul, MN, USA, is compounded and molded into FKM rubber plates (100 mm×100 mm×1 mm). Circular pads having a diameter of approximately 75 mm and thickness of approximately 1 mm are cut from the plates.

VMQ O-rings: Standard ASTM 214 O-rings having a diameter of approximately 25 mm and a thickness of about 3.5 mm are molded from silicone rubber, obtained from Veritas AG, Germany.

Preparation of the VMQ Silicone Rubber Pads Coated with FKM Fluoropolymer Cured Layer:

Firstly, a fluoroelastomer composition is prepared by mixing on a two-roll mill, 100 parts by weight of a peroxide curable fluoroelastomer terpolymer comprising units derived from TFE, HFP and VDF monomer units (obtained from 3M Belgium, Zwijndrecht, under the designation E-21900), with 30 parts by weight of carbon black filler (commercially available from Cancarb, Canada, under the trade designation Carbon Black Thermax N990), 3 parts by weight of a peroxide curative (commercially available from Akzo Nobel Functional Chemicals, The Netherlands, under trade designation Trigonox 101-50D-pd) and 2.85 parts by weight of coagent TAIC (70%) (commercially available from Lehman & Voss). The compounded formulation is cut into small pieces of approximately 0.5 cm in size, which are then added to a beaker of acetone solvent.

The solvent is added in a quantity to make up a solution containing 15% by weight of fluoropolymer. The beaker is placed on a roller mixer and continuously mixed overnight. The fluoropolymer is completely dissolved.

The solution is then bar coated onto the VMQ circular pads, using a 200μ Zehnter coater. After air drying overnight, a second layer is applied and air dried overnight followed by a drying step at 60° C. for 40 minutes. Curing is done in an oven for 15 minutes at 177° C. and post cured for 2 hr at 200° C. The cured fluoropolymer coating has a thickness of approximately 120 micrometers.

Preparation of the VMQ Silicone Rubber Pads Coated with FFKM Perfluoroelastomer Cured Layer:

Firstly, a perfluoroelastomer composition is prepared by mixing on a two-roll mill, 100 parts by weight of a curable perfluoropolymer, under the trade designation PFE40Z (available from 3M Company, St. Paul, MN, USA) with 20 parts by weight of carbon black filler (commercially available from Cancarb, Canada, under the trade designation Carbon Black Thermax N990), 1.5 parts by weight of a peroxide curative (commercially available from Akzo Nobel Functional Chemicals, The Netherlands, under trade designation Trigonox 101-50D-pd) and 2.5 parts by weight of coagent TAIC (70%) (commercially available from Lehman & Voss).

The compounded formulation is cut into small pieces, approximately 0.5 cm in size. These pieces are added to a beaker of solvent, a partially fluorinated polyether (1,1,1,2,2,3,4,5,5,5-decafluoro-3-methoxy-4-(trifluoromethyl)-pentane). The solvent is added in a quantity to make up a solution containing 15% by weight of perfluoroelastomer. The beaker is placed on a roller mixer and continuously mixed overnight. The perfluoroelastomer is completely dissolved.

The solution is then bar coated onto the VMQ circular pads, using a 200µ Zehnter coater. After air drying overnight, a second layer is applied. The same procedure is followed for a third and fourth layer, followed by a drying step at 60° C. for 40 minutes. Curing is done in an oven for 15 minutes at 140° C. and post cured for 2 hr at 200° C. The cured perfluoroelastomer coating has a thickness of approximately 120 micrometers.

Preparation of the FKM Fluoropolymer Pads Coated with FFKM Perfluoroelastomer Cured Layer:

Firstly, a perfluoroelastomer composition is prepared by mixing on a two-roll mill, 100 parts by weight of a curable perfluoropolymer, under the trade designation PFE40Z (available from 3M Company, St. Paul, MN, USA) with 20 parts by weight of carbon black filler (commercially available from Cancarb, Canada, under the trade designation Carbon Black Thermax N990), 1.5 parts by weight of a peroxide curative (commercially available from Akzo Nobel Functional Chemicals, The Netherlands, under trade designation Trigonox 101-50D-pd) and 2.5 parts by weight of coagent TAIC (70%) (commercially available from Lehman & Voss).

The compounded formulation is cut into small pieces, approximately 0.5 cm in size. These pieces are added to a beaker of solvent, a partially fluorinated polyether (1,1,1,2,2,3,4,5,5,5-decafluoro-3-methoxy-4-(trifluoromethyl)-pentane). The solvent is added in a quantity to make up a solution containing 15% by weight of perfluoroelastomer. The beaker is placed on a roller mixer and continuously mixed overnight. The perfluoroelastomer is completely dissolved.

The solution is then bar coated onto the FKM fluoropolymer circular pads, using a 200µ Zehnter coater. After air drying overnight, a second layer is applied. The same procedure is followed for a third and fourth layer, followed by a drying step at 60° C. for 40 minutes. Curing is done in an oven for 15 minutes at 140° C. and post cured for 2 hr at 200° C. The cured perfluoroelastomer coating has a thickness of approximately 120 micrometers.

Preparation of the VMQ Silicone Rubber O-rings Coated with FFKM Perfluoroelastomer Cured Layer: Firstly, a perfluoroelastomer composition is prepared by mixing on a two-roll mill, 100 parts by weight of a curable perfluoropolymer, under the trade designation PFE40Z (available from 3M Company, St. Paul, MN, USA) with 0.75 parts by weight of peroxide curative, under the trade designation Luperox P (98%) (commercially available from Sigma Aldrich, Germany) and 1.5 parts by weight of neat coagent TAIC (commercially available from Evonik).

The compounded formulation is cut into small pieces, approximately 0.5 cm in size. These pieces are added to a beaker of solvent, a partially fluorinated polyether (1,1,1,2,2,3,4,5,5,5-decafluoro-3-methoxy-4-(trifluoromethyl)-pentane). The solvent is added in a quantity to make up a solution containing 15% by weight of perfluoroelastomer. The beaker is placed on a roller mixer and continuously mixed overnight. The perfluoroelastomer is completely dissolved.

The VMQ O-ring is dip coated in the above-described perfluoroelastomer composition, air dried for 1 hour at 23° C., followed by a drying step in oven for 40 minutes at 60° C., and subsequently cured in oven for 10 minutes at 140° C. This procedure is repeated four times in total. Finally, the coated O-rings are post-cured in an oven for 2 hours at 200° C.

Prior to testing the uncoated VMQ O-ring is press cured for 7 minutes at 177° C., and post cured in oven for 2 hours at 200° C.

Preparation of an Assembly Comprising an Elastomeric Substrate and a Metal Substrate with a FFKM Perfluoroelastomer Layer In-Between:

Firstly, a perfluoroelastomer composition is prepared by mixing on a two-roll mill, 100 parts by weight of a curable perfluoropolymer, under the trade designation PFE40Z (available from 3M Company, St. Paul, MN, USA) with 24 parts by weight of carbon black filler (commercially available from Cancarb, Canada, under the trade designation Carbon Black Thermax N990), 2.5 parts by weight of ZnO (commercially available from Bayer), 1.5 parts by weight of a peroxide curative (commercially available from Akzo Nobel Functional Chemicals, The Netherlands, under trade designation Trigonox 101-50D-pd) and 2.5 parts by weight of coagent TAIC (70%) (commercially available from Lehman & Voss).

The compounded formulation is cut into small pieces, approximately 0.5 cm in size. These pieces are added to a beaker of solvent, a partially fluorinated polyether (1,1,1,2,2,3,4,5,5,5-decafluoro-3-methoxy-4-(trifluoromethyl)-pentane). The solvent is added in a quantity to make up a solution containing 10% by weight of perfluoroelastomer. The beaker is placed on a roller mixer and continuously mixed overnight. The perfluoroelastomer is completely dissolved.

The solution is then bar coated onto a part of an aluminium Q panel (obtained from Labomat), 15 cm by 7.5 cm in dimension or onto a sandblasted steel plate. It is contemplated that a substrate comprising an elastomeric material may be contacted with the coating layer present on the aluminum panel or the steel plate, followed by the step of subjecting the coating layer to a heat-curing step, and optionally a further post cure step.

Test Results:

Permeation (in CE10 at 40° C.)

Table 1 shows the permeation constant of various uncoated substrate pads and various substrate pads coated with various fluoropolymer coating. The FKM fluoropolymer coating is not according to the present disclosure, whereas the FFKM perfluroelastomer coating is according to the present disclosure.

TABLE 1

| Substrate | | Permeation constant (g-mm/m²-day) |
|---|---|---|
| Comparative Example 1 | VMQ uncoated | 775 |
| Comparative Example 2 | VMQ coated with FKM | 74 |

TABLE 1-continued

| Substrate | | Permeation constant (g-mm/m²-day) |
|---|---|---|
| Example 3 | VMQ coated with FFKM | 8 |
| Comparative Example 4 | FKM uncoated | 8 |
| Example 5 | FKM coated with FFKM | 4 |

Table 1 shows the outstanding decrease in permeation obtained with a fluoropolymer coating according to the disclosure (Example 3) on a substrate comprising an elastomeric material, when compared to a fluoropolymer coating not according to the disclosure (Comparative Example 2) or to uncoated substrates (Comparative Examples 1 and 4).

Solvent Swell Resistance (in Acetone, 24 Hours at 23° C.)

Table 2 shows the overall % volume swell measured on uncoated VMQ silicone rubber O-ring samples and on VMQ silicone rubber O-ring samples coated with a fluoropolymer coating according to the disclosure.

TABLE 2

| Substrate | | Volume swell (%) |
|---|---|---|
| Comparative Example 6 | VMQ O-rings uncoated | 34 |
| Example 7 | VMQ O-rings coated with FFKM | 2 |

Table 2 shows the excellent solvent swell resistance obtained with a fluoropolymer coating according to the disclosure (Example 7) on a substrate comprising an elastomeric material, when compared to uncoated substrates (Comparative Example 6).

The invention claimed is:

1. A method of treating a substrate comprising an elastomeric material, wherein the method comprises the steps of:
   a) providing a composition comprising:
      i. at least one fluoropolymer which is a copolymer comprising at least 90% by weight, based on the total weight of the copolymer, of units derived from tetrafluoroethene (TFE) and from one or more perfluorinated alkyl ethers corresponding to the general formula (I):

$$R_{f1}-O-(CF_2)_n-CF=CF_2 \quad (I)$$

wherein n is 1 or 0 and $R_{f1}$ represents a perfluoroalkyl residue which is optionally interrupted once or more than once by an oxygen atom; and
      ii. at least one solvent comprising a linear, cyclic or branched, partially fluorinated (poly)ether;
   b) contacting at least part of the elastomeric material with the composition of step a);
   c) at least partially removing the at least one solvent.

2. A method according to claim 1, where the fluoropolymer is curable, and the method further comprises subjecting the fluoropolymer to curing, wherein the curing step is carried out simultaneously with or after step c).

3. A method according to claim 1, wherein the units derived from one or more perfluorinated alkyl ethers are selected from the group consisting of perfluorinated alkyl vinyl ethers (PAVE's), from the group consisting of perfluorinated methyl vinyl ether (PMVE), perfluorinated ethyl vinyl ether (PEVE), perfluorinated (n-propyl vinyl) ether (PPVE-1), perfluorinated 2-propoxypropylvinyl ether (PPVE-2), perfluorinated 3-methoxy-n-propylvinyl ether, perfluorinated 2-methoxy-ethylvinyl ether, $CF_2=CF-O-CF_2-O-C_2F_5$, $CF_2=CF-O-CF_2-O-C_3F_7$, $CF_3-(CF_2)_2-O-CF(CF_3)-CF_2-O-CF(CF_3)-CF_2-O-CF=CF_2$, and any combinations or mixtures thereof.

4. A method according to claim 1, wherein the partially fluorinated (poly)ether corresponds to the general formula (II):

$$R_{f2}-O-R \quad (II)$$

wherein $R_{f2}$ is a fluoroalkyl residue selected from perfluorinated or partially fluorinated alkyl groups that may be interrupted once or more than once by an ether oxygen and R is selected from partially fluorinated and non-fluorinated alkyl groups.

5. A method according to claim 1, wherein the partially fluorinated (poly)ether corresponds to the general formula (III):

$$C_pF_{2p+1}-O-C_qH_{2q+1} \quad (III)$$

wherein q is an integer from 1 to 5, and p is an integer from 5 to 11.

6. A method according to claim 1, wherein the fluoropolymer is an elastomeric fluoropolymer comprising one or more cure-sites, and wherein the composition further comprises at least one curing agent for curing the fluoropolymer.

7. A method according to claim 6, wherein the curing system is selected from the group consisting of peroxide-based curing systems, bisaminophenol and bisphenol AF curing systems, nitrogen-based curing systems, and any combinations or mixtures thereof.

8. A method according to claim 1, wherein the elastomeric material comprises a polymer selected from the group consisting of hydrocarbon rubbers, silicone rubbers; fluorosilicone rubbers; fluoroelastomers; perfluoroelastomers; and any combinations or mixtures thereof.

9. The method according to claim 8, wherein the elastomeric material comprising a hydrocarbon rubber selected from the group consisting of polyacrylates, polyurethanes, polyamines, polyamides, polyesters, polyethers, polyolefins, polyvinyls, polyvinylpyrrolidone, natural rubbers, synthetic rubbers, hydrocarbon rubbers, natural or synthetic polyisoprenes, polybutadienes, chloroprene rubbers, butyl rubbers, halogenated butyl rubbers, styrene-butadiene rubbers, nitrile rubbers, hydrogenated nitrile rubbers, ethylene propylene rubbers, ethylene propylene diene rubbers, epichlorohydrin rubbers, polyether block amides, chlorosulfonated polyethylenes, ethylene vinyl acetates, thermoplastic elastomers, styrene block copolymers, thermoplastic poyolefin elastomers, thermoplastic vulcanizates, thermoplastic polyurethanes, thermoplastic copolyesters, thermoplastic polyamides, ethylene acrylic rubbers; and any combinations or mixtures thereof.

* * * * *